(12) United States Patent
Park et al.

(10) Patent No.: US 9,413,175 B2
(45) Date of Patent: Aug. 9, 2016

(54) WIRELESS CHARGING SYSTEM FOR TRANSFERRING POWER TO RECEIVERS HAVING DIFFERENT STANDARDS USING COILS OF DIFFERING SHAPES

(71) Applicant: LG ELECTRONICS INC., Seoul (KR)

(72) Inventors: Jinmoo Park, Seoul (KR); Jaesung Lee, Seoul (KR); Jihyun Lee, Seoul (KR); Jeongkyo Seo, Seoul (KR); Homan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 14/293,797

(22) Filed: Jun. 2, 2014

(65) Prior Publication Data

US 2014/0354222 A1    Dec. 4, 2014

Related U.S. Application Data

(60) Provisional application No. 61/830,466, filed on Jun. 3, 2013, provisional application No. 61/835,639, filed on Jun. 17, 2013, provisional application No. 61/924,242, filed on Jan. 7, 2014.

(30) Foreign Application Priority Data

May 8, 2014    (KR) .......................... 10-2014-0054985
May 20, 2014   (KR) .......................... 10-2014-0060541
May 30, 2014   (KR) .......................... 10-2014-0066331

(51) Int. Cl.
*H02J 7/00*      (2006.01)
*H02J 5/00*      (2016.01)
(Continued)

(52) U.S. Cl.
CPC ............... *H02J 5/005* (2013.01); *H01F 38/14* (2013.01); *H02J 7/025* (2013.01); *H04B 5/0037* (2013.01); *H04B 7/24* (2013.01); *H01F 2038/146* (2013.01); *H02J 7/04* (2013.01)

(58) Field of Classification Search
CPC ........................................................ H02J 7/025
USPC ................................................. 320/107–108
See application file for complete search history.

(56) References Cited

U.S. PATENT DOCUMENTS

2008/0297107 A1    12/2008  Kato et al.
2010/0259217 A1*   10/2010  Baarman ................. H02J 5/005
                                                    320/108

(Continued)

FOREIGN PATENT DOCUMENTS

CN    202906546 U     4/2013
JP      5047407 B1   10/2012

(Continued)

OTHER PUBLICATIONS

Elec & Eltek E & E Magnetic Products Limited, "Low Power Coil Module Magnetic Module Selection Guide (5W Transmitter)," Revised in Nov. 2013, 1 page.

*Primary Examiner* — Stacy Whitmore
(74) *Attorney, Agent, or Firm* — Birch, Stewart, Kolasch & Birch, LLP

(57) ABSTRACT

The present disclosure relates to a wireless power transfer method, a wireless power transmitter and a wireless charging system in a wireless power transfer field. That is, a wireless power transmitter configured transfer power to a wireless power receiver in a wireless manner, the transmitter configured to a first coil configured to convert a current into a magnetic flux, a second coil configured to be adjacent to the first coil on a plane, a third coil configured to have a different shape from the first and second coils and have at least part thereof which overlaps the first and second coils, respectively, and a controller configured to determine a coil to be activated among the first, second and third coils.

19 Claims, 27 Drawing Sheets

(51) Int. Cl.
  *H02J 7/02*   (2016.01)
  *H04B 7/24*   (2006.01)
  *H04B 5/00*   (2006.01)
  *H02J 7/04*   (2006.01)
  *H01F 38/14*   (2006.01)

(56) References Cited

U.S. PATENT DOCUMENTS

| | | | |
|---|---|---|---|
| 2010/0320963 A1* | 12/2010 | Cheng | H01F 3/02 |
| | | | 320/108 |
| 2012/0286726 A1 | 11/2012 | Kim et al. | |
| 2012/0313577 A1* | 12/2012 | Moes | H04B 5/0037 |
| | | | 320/108 |
| 2013/0015719 A1 | 1/2013 | Jung et al. | |
| 2013/0093253 A1* | 4/2013 | Norconk | H02J 5/005 |
| | | | 307/104 |
| 2013/0093390 A1* | 4/2013 | Partovi | H02J 7/025 |
| | | | 320/108 |
| 2013/0214612 A1 | 8/2013 | Bae | |
| 2014/0184147 A1 | 7/2014 | Uchida | |
| 2014/0210406 A1 | 7/2014 | Na et al. | |
| 2014/0300317 A1 | 10/2014 | Kim | |
| 2014/0354052 A1 | 12/2014 | Masaoka et al. | |

FOREIGN PATENT DOCUMENTS

| | | |
|---|---|---|
| JP | 2013-26623 A | 2/2013 |
| JP | 2013-172640 A | 9/2013 |
| KR | 10-2012-0047027 A | 5/2012 |
| KR | 10-2013-0005571 A | 1/2013 |
| KR | 10-2013-0024757 A | 3/2013 |
| WO | WO 2011/021178 A2 | 2/2011 |
| WO | WO 2013/035873 A1 | 3/2013 |
| WO | WO 2013/062253 A1 | 5/2013 |

* cited by examiner

FIG. 11
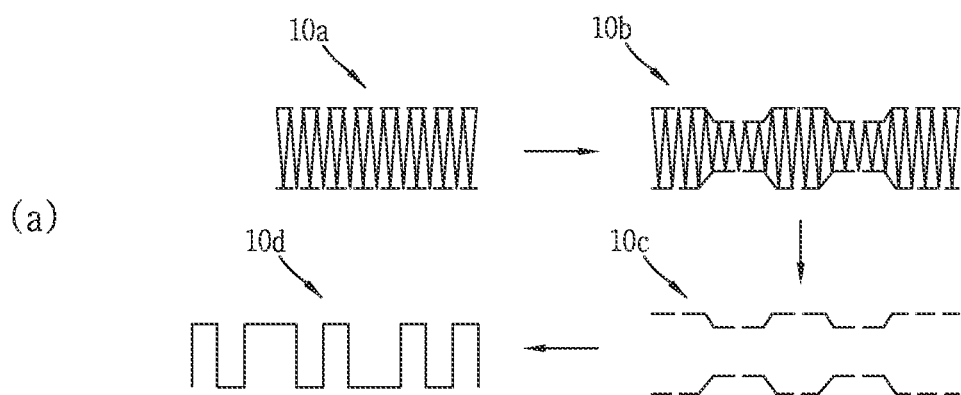
(a)
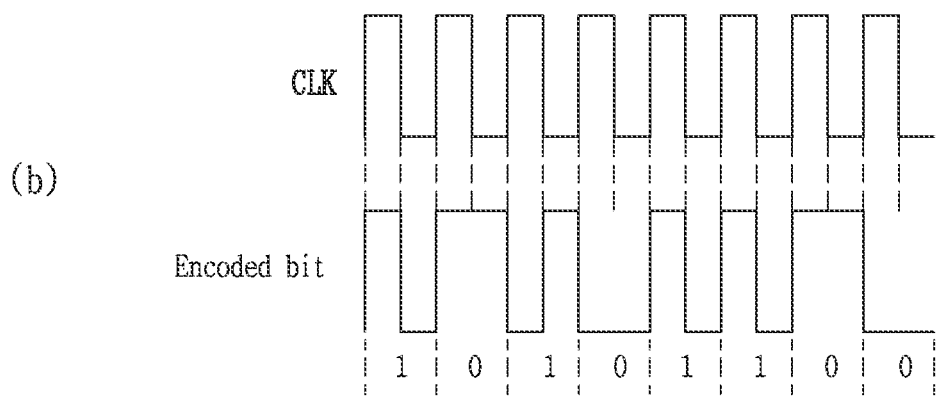
(b)
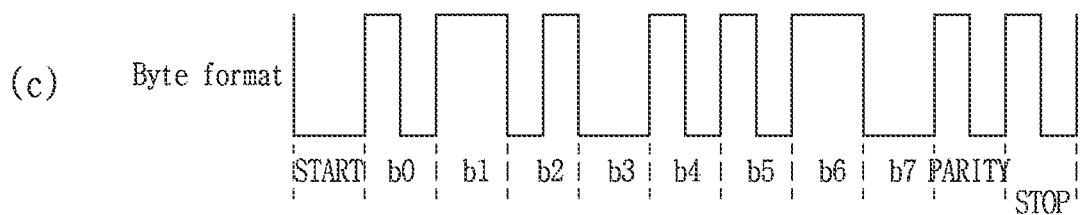
(c)

|    | b7 | b6 | b5 | b4 | b3 | b2 | b1 | b0 |
|----|----|----|----|----|----|----|----|----|
| B0 | HEADER (5220) |||||||| 
| B1 | MAJOR VERSION (5231) |||| MINOR VERSION (5232) ||||
| B2 | MANUFACTURER CODE (5233) ||||||||
| B3 | ||||||||
| B4 | EXT (5234) | |||||||
| ⋮  | BASIC DEVICE IDENTIFIER (5235) ||||||||
| B7 | ||||||||

|    | b7 | b6 | b5 | b4 | b3 | b2 | b1 | b0 |
|----|----|----|----|----|----|----|----|----|
| B0 | HEADER (5320) ||||||||
| B1 | ||||||||
| ⋮  | EXTENDED DEVICE IDENTIFIER (5330) ||||||||
| B8 | ||||||||

|    | b7 | b6 | b5 | b4 | b3 | b2 | b1 | b0 |
|----|----|----|----|----|----|----|----|----|
| B0 | HEADER (5420) ||||||||
| B1 | POWER CLASS (5431) | MAXIMUM POWER (5432) |||||||
| B2 | RESERVED ||||||||
| B3 | PROP (5433) | RESERVED ||| COUNT (5434) ||||
| B4 | RESERVED ||||||||
| B5 |  ||||||||

|    | b7 | b6 | b5 | b4 | b3 | b2 | b1 | b0 |
|----|----|----|----|----|----|----|----|----|
| B0 | HEADER (5520) ||||||||
| B1 | CONTROL ERROR VALUE (5530) ||||||||

|    | b7 | b6 | b5 | b4 | b3 | b2 | b1 | b0 |
|----|----|----|----|----|----|----|----|----|
| B0 | HEADER (5620) ||||||||
| B1 | END POWER TRANSFER CODE (5630) ||||||||

5600

FIG. 30
(a) 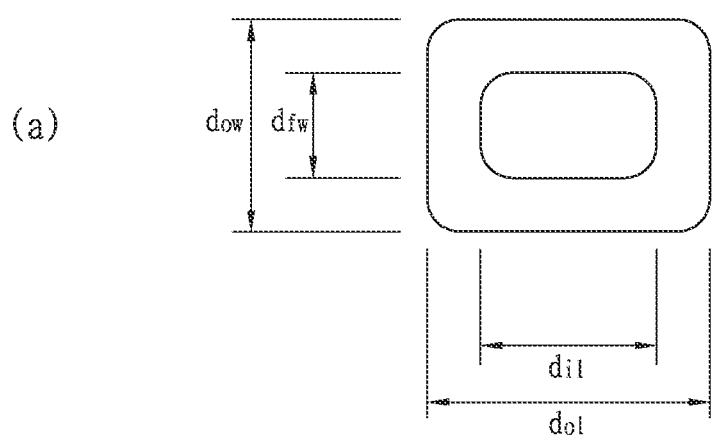
(b) 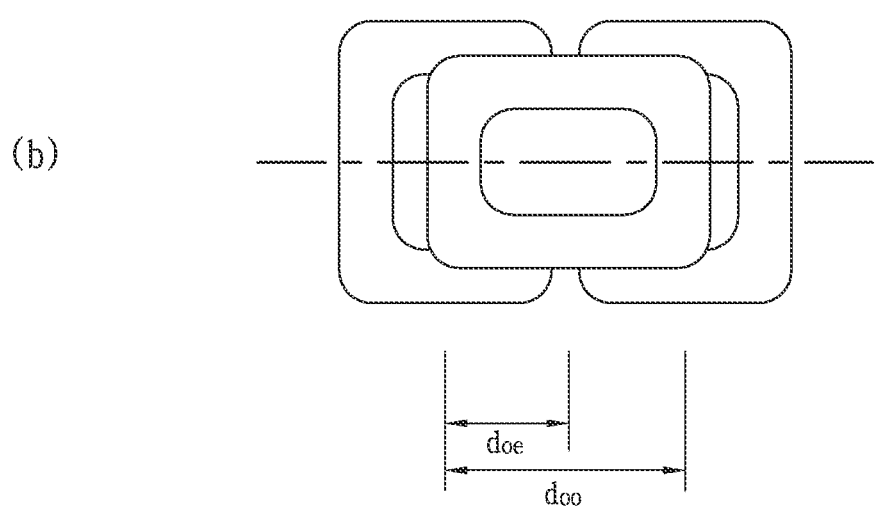

FIG. 34
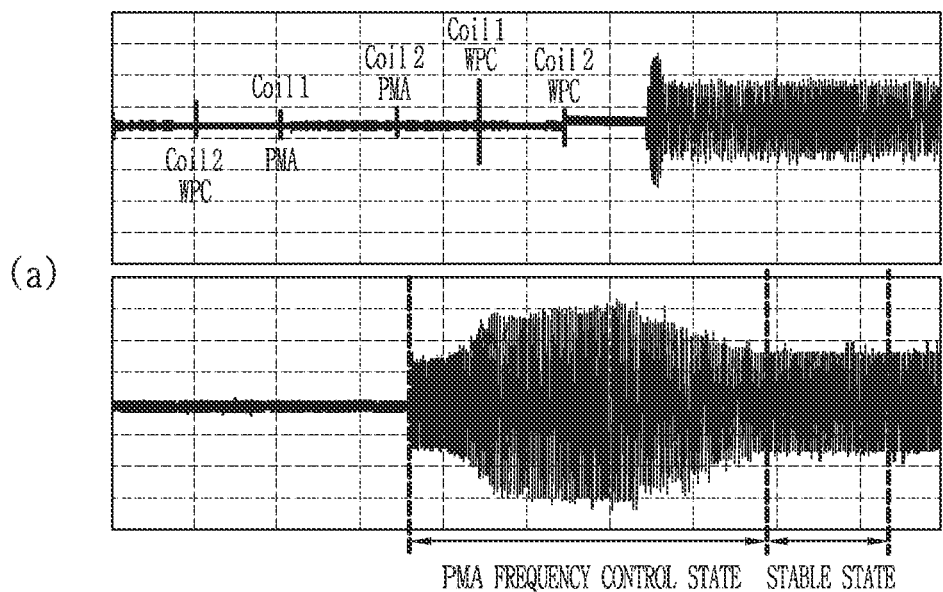
(a)
PMA FREQUENCY CONTROL STATE    STABLE STATE
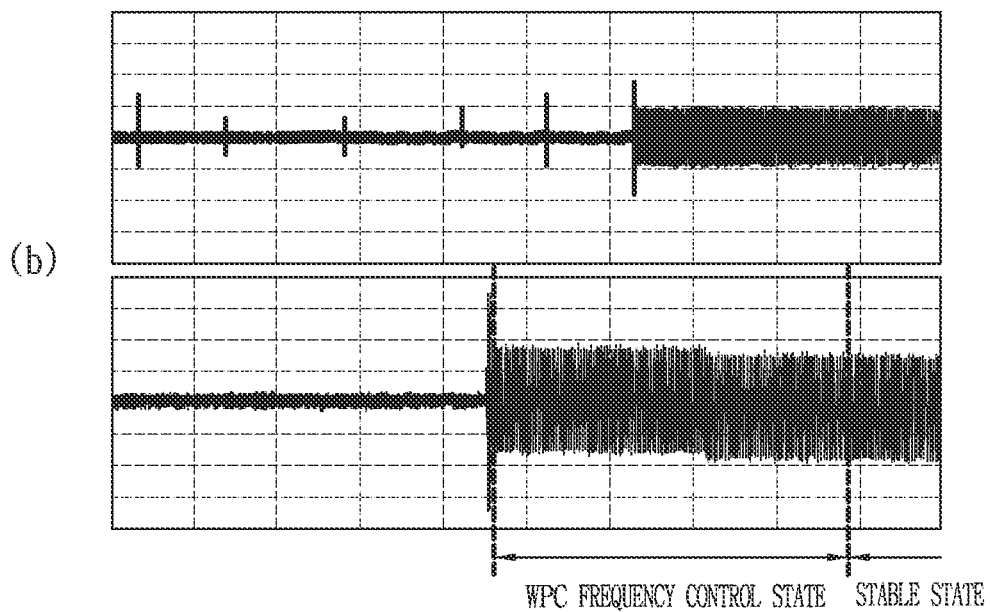
(b)
WPC FREQUENCY CONTROL STATE    STABLE STATE

WIRELESS CHARGING SYSTEM FOR TRANSFERRING POWER TO RECEIVERS HAVING DIFFERENT STANDARDS USING COILS OF DIFFERING SHAPES

CROSS-REFERENCE TO RELATED APPLICATION

Pursuant to 35 U.S.C. §119(a), this application claims the benefit of earlier filing date and right of priority to U.S. provisional Application Nos. 61/830,466, 61/835,639 and 61/924,242 filed on Jun. 3, 2013, Jun. 17, 2013 and Jan. 7, 2014, and Korean Application Nos. 10-2014-0054985, 10-2014-0060541, 10-2014-0066331 filed on May 8, 2014, May 20, 2014, May 30, 2014, the contents of which are incorporated by reference herein in their entireties.

BACKGROUND OF THE DISCLOSURE

1. Field of the Disclosure

This specification relates to a wireless power transfer method, apparatus, and system in a wireless power transfer field.

2. Background of the Disclosure

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power. Part 1: Interface Definition, Version 1.00 Release Candidate 1 (RC1)" for interoperability in the wireless power transfer on Apr. 12, 2010.

Power Matters Alliance as another technology standardization consortium has been established on March, 2012, developed a product line of interface standards, and published a standard document based on an inductive coupling technology for providing inductive and resonant power.

A wireless charging method using electromagnetic induction is frequently encountered in our lives, for example, is utilized by being commercialized in electric toothbrushes, wireless coffee ports and the like.

WPC1.1 standard and PMA1.1 standard have been published, but they have problems that a receiver has to be correctly arranged on a charging coil and interoperability between the standards is not good. Therefore, it is required to develop a transmitter having interoperability between wireless charging standards.

SUMMARY OF THE DISCLOSURE

Therefore, an aspect of the detailed description is to provide a wireless power transfer method, a wireless power transmitter and a wireless charging system, capable of providing interoperability between a WPC standard and a PMA standard.

Another aspect of the detailed description is to provide a new type of multi-coil solution, capable of extending a degree of position freedom of receivers by an assembly of single coils compliant with different standards in a wireless charging field.

One aspect of the detailed description is to provide a wireless power transfer method, a wireless power transmitter and a wireless charging system, capable of providing interoperability between a WPC standard and a PMA standard. To this end, a wireless power transmitter configured to transfer power to a wireless power receiver in a wireless manner may include a first coil configured to convert a current into a magnetic flux, a second coil configured to be adjacent to the first coil on a plane, a third coil configured to have a different shape from the first and second coils and have at least part thereof which overlaps the first and second coils, respectively, and a controller configured to determine a coil to be activated among the first, second and third coils.

In accordance with one exemplary embodiment disclosed herein, the controller may selectively apply one of a plurality of voltages to the third coil.

In accordance with one exemplary embodiment disclosed herein, the controller may control a driving circuit unit. The driving circuit unit may include a first switch connected to a first capacitor, and a second switch connected to a second capacitor. The first capacitor and the second capacitor may be connected to the third coil in parallel.

In accordance with one exemplary embodiment disclosed herein, the first and second switches may be controlled to apply the one of the plurality of voltages to the third coil according to whether the standard corresponds to a first standard or a second standard, different from each other.

In accordance with one exemplary embodiment disclosed herein, The controller may apply an input voltage to at least one of the first, second and third coils, and after detection of the standard, may boost or depressurize the input voltage to correspond to the standard.

In accordance with one exemplary embodiment disclosed herein, the controller may determine which one of the first, second and third coils is to be controlled when the standard is the first standard, and carry out a frequency control by boosting the input voltage applied to the third coil when the standard is the second standard.

In accordance with one exemplary embodiment disclosed herein, the first and second coils may be coils to which the input voltage is applied in compliance with the first standard, and the third coil may be set such that a voltage higher than the input voltage is applied thereto.

In accordance with one exemplary embodiment disclosed herein, the first and second coils may be coils for which a frequency control or a voltage control is carried out in compliance with the first standard, and the third coil may be a coil for which the voltage control is carried out in compliance with the first standard.

In accordance with one exemplary embodiment disclosed herein, the first and second coils may be wound into a quadrilateral shape in which at least part is straight (linear), and the third coil may be wound into a circular shape.

In accordance with one exemplary embodiment disclosed herein, the first and second coils may consist of a single layer, and the third coil may consist of a plurality of layers in a manner that the coil is connected at an inner side thereof and wounded into a plurality of layers.

In accordance with one exemplary embodiment disclosed herein, the third coil may be a coil which complies with both the first standard and the second standard, and the first and second coils may be coils compliant with the first standard.

A wireless power transfer method, which is configured to transfer power to a wireless power receiver in a wireless manner in accordance with one exemplary embodiment disclosed herein, may include applying an input voltage to at least one of first, second, and third coils, detecting a standard applied to the wireless power receiver to correspond to the input voltage, and detecting a coil to be driven from the first, second and third coils when the standard is a first standard, and driving the third coil when the standard is a second standard.

In accordance with one exemplary embodiment disclosed herein, the detecting of the coil to be driven may be carried out to detect whether a coil to be driven is a coil wound into a quadrilateral shape or a coil wound into a circular shape when the standard is the first standard.

In accordance with one exemplary embodiment disclosed herein, the input voltage may be boosted when the coil to be driven is the coil wound into the circular shape, and the input voltage may be maintained when the coil to be driven is a coil wound into a quadrilateral shape.

In accordance with one exemplary embodiment disclosed herein, the input voltage may be boosted and a frequency control may be carried out when the standard is the second standard.

A wireless charging system in accordance with one exemplary embodiment disclosed herein may include a transmitter configured to transfer power in a wireless manner, and a receiver configured to receive power in a wireless manner, wherein the transmitter may include a first coil configured to convert a current into a magnetic flux, a second coil configured to be adjacent to the first coil on a plane, a third coil configured to have a different shape from the first and second coils and have at least part thereof which overlaps the first and second coils, respectively, and a controller configured to determine a coil to be activated among the first, second and third coils.

In accordance with one exemplary embodiment disclosed herein, the controller may selectively apply one of a plurality of voltages to the third coil.

In accordance with one exemplary embodiment disclosed herein, the controller may apply an input voltage to at least one of the first, second and third coils, and after detection of the standard, may boost or depressurize the input voltage to correspond to the standard.

In accordance with one exemplary embodiment disclosed herein, the first and second coils may be wound into a quadrilateral shape in which at least part is straight (linear), and the third coil may be wound into a circular shape.

A wireless power transmitter, which is configured to transfer power to a wireless power receiver in a wireless manner, in accordance with another exemplary embodiment disclosed herein may include a power transfer unit configured to transmit power to the wireless power receiver in the wireless manner, a circuit unit having a plurality of capacitors electrically connected to the power transfer unit, and configured to support each of a plurality of frequencies by changing the electric connection of the capacitors, and a controller configured to detect a communication standard that the wireless power receiver supports, and control the electric connection of the capacitors such that the circuit unit operates at a frequency corresponding to the detected communication standard.

In accordance with one exemplary embodiment disclosed herein, the circuit unit may vary the number of capacitors included in a resonant circuit for transmitting power in the wireless manner among the plurality of capacitors.

In accordance with one exemplary embodiment disclosed herein, the circuit unit may include a first capacitor electrically connected to the power transfer unit, a second capacitor connected to the first capacitor in parallel, and a switch connected to the second capacitor. The controller may control the electric connection of the second capacitor using the switch.

In accordance with one exemplary embodiment disclosed herein, the controller may turn on the switch when the detected communication standard is a Wireless Power Consortium (WPC) communication standard, and turns off the switch when the detected communication standard is a Power Matters Alliance (PMA) communication standard.

In accordance with one exemplary embodiment disclosed herein, the controller may generate signals complying with different communication standards in a sequential manner, to detect a communication standard that the wireless power receiver supports.

In accordance with one exemplary embodiment disclosed herein, the signals may include a first signal complying with a first communication standard, and a second signal complying with a second communication standard. The controller may decide whether the wireless power receiver supports the first communication standard or the second communication standard using a response of the wireless power receiver to one of the first and second signals.

In accordance with one exemplary embodiment disclosed herein, the controller may control the electric connection of the plurality of capacitors such that the circuit unit operates in a frequency range corresponding to the decided one communication standard when the one communication standard is decided.

In accordance with one exemplary embodiment disclosed herein, the controller may boost or depressurize an input voltage such that the circuit unit can support the decided one communication standard when the one communication standard is decided.

In accordance with one exemplary embodiment disclosed herein, the controller may carry out one of a frequency control and a voltage control with respect to the power transfer unit based on the decided one communication standard when the one communication standard is decided.

In accordance with one exemplary embodiment disclosed herein, the circuit unit may include a first switch connected to a first capacitor, and a second switch connected to a second capacitor. The first capacitor and the second capacitor may be connected in parallel, and the controller may control an electric connection of the second capacitor using the first and second switches.

In accordance with one exemplary embodiment disclosed herein, the controller may control the first and second switches such that both of the first and second capacitors are electrically connected to the power transfer unit when the communication standard complies with the WPC, and control the first and second switches such that one of the first and second capacitors is electrically connected to the power transfer unit when the communication standard complies with the PMA.

In accordance with one exemplary embodiment disclosed herein, the power transfer unit may be a WPC-compliant A13 coil for which a frequency control or a voltage control is carried out.

A wireless power transfer method, which is configured to transmit power to a wireless power receiver in a wireless manner, in accordance with one exemplary embodiment disclosed herein may include generating a first signal complying with a first communication standard and a second signal complying with a second communication standard in a sequential manner, so as to detect a communication standard that the wireless power receiver supports, determining a communication standard that the wireless power receiver supports from the first and second communication standards, using a response of the receiver to one of the first and second signals, and controlling an electric connection of a plurality of capacitors such that power is transferred in the wireless manner at one of a plurality of frequency bands according to the determined communication standard.

In accordance with one exemplary embodiment disclosed herein, the controlling of the electric connection of the capacitors may be performed to decide the number of capacitors to be used in a resonant circuit compliant with the determined communication standard.

In accordance with one exemplary embodiment disclosed herein, a first capacitor and a second capacitor may be provided. A switch may be connected to the second capacitor. The controlling of the electric connection of the capacitors may be performed to turn on the switch when the determined communication standard is the WPC communication standard.

In accordance with one exemplary embodiment disclosed herein, the method may further include boosting or depressurizing an input voltage according to the determined communication standard.

A wireless charging system in accordance with one exemplary embodiment disclosed herein may include a transmitter configured to transmit power in a wireless manner, and a receiver configured to receive power from the transmitter in a wireless manner. Here, the transmitter may include a power transfer unit configured to transmit power to the receiver in the wireless manner, a circuit unit having a plurality of capacitors electrically connected to the power transfer unit, and configured to support each of a plurality of frequencies by changing the electric connection of the capacitors, and a controller configured to detect a communication standard that the wireless power receiver supports, and control the electric connection of the capacitors such that the circuit unit operates at a frequency corresponding to the detected communication standard.

In accordance with one exemplary embodiment disclosed herein, the power transfer unit may be configured as a WPC-compliant A13 coil. The controller may decide the number of capacitors to be included in a resonant circuit compliant with the communication standard which the receiver complies with.

In accordance with one exemplary embodiment disclosed herein, the circuit unit may further include a switch connected to at least part of the plurality of capacitors, and the controller may decide a capacitor to be used in the resonant circuit using the switch.

In accordance with one exemplary embodiment disclosed herein, the controller may generate signals complying with different communication standards in a sequential manner so as to detect the standard that the receiver supports.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 11 is a view illustrating forms of signals upon modulation and demodulation executed in a wireless power transfer disclosed herein;

FIG. 12 is a view illustrating a packet including a power control message used in a contactless (wireless) power transfer method according to the embodiments disclosed herein;

FIGS. 14 to 18 are views illustrating the structure of packets including a power control message between the wireless power transmitter 100 and the wireless power receiver;

FIG. 30 is a conceptual view illustrating a coil useable in a wireless power transmitter;

FIG. 34 is a graph illustrating test results according to FIG. 33; and

DETAILED DESCRIPTION OF THE DISCLOSURE

Figure 1:
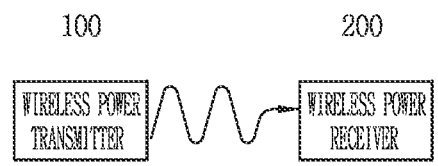
FIG. 1 is an exemplary view conceptually illustrating a wireless power transmitter and a wireless power receiver according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Here, the transmitter and the receiver indicate the same as a transmitting unit (device) and a receiving unit (device), respectively. Hereinafter, those terms may be used together.

FIG. 1—Conceptual View of Wireless Dower Transmitter and Wireless Power Receiver FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
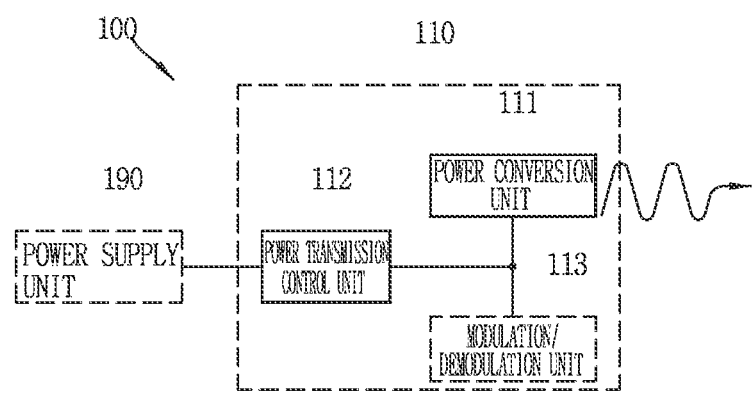
FIGS. 2A and 2B are exemplary block diagrams illustrating the configuration of a wireless power transmitter and a wireless power receiver that can be employed in the embodiments disclosed herein, respectively.
Figure 2B:
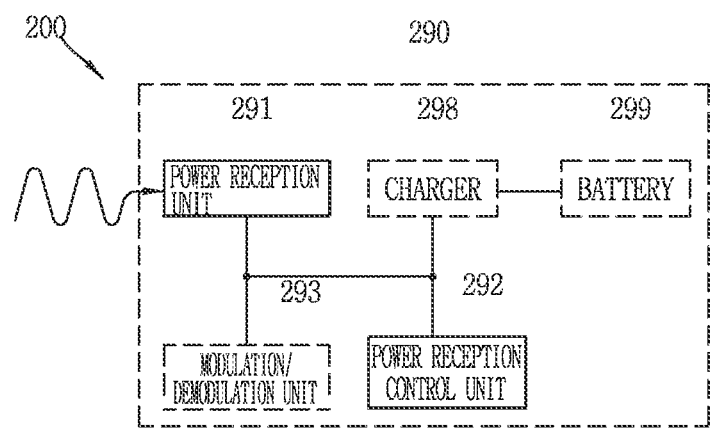

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting in-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
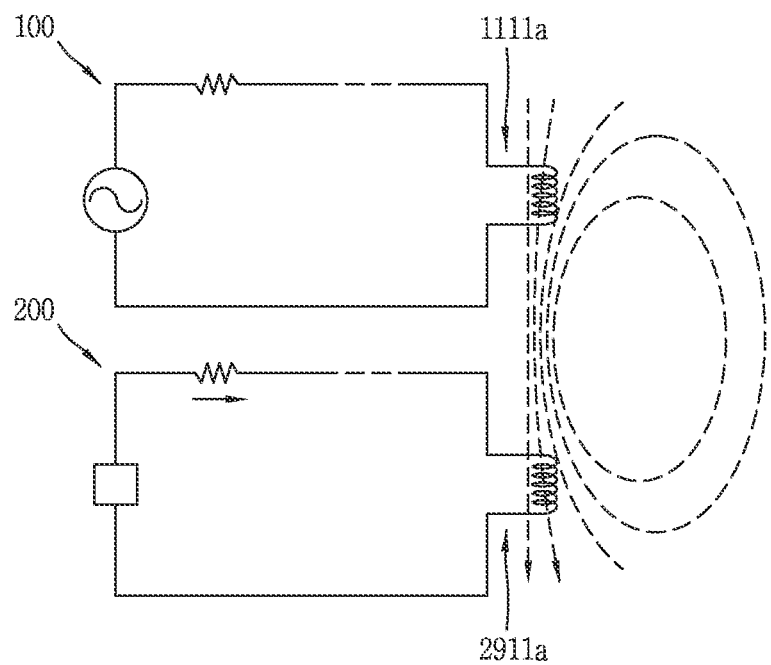
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
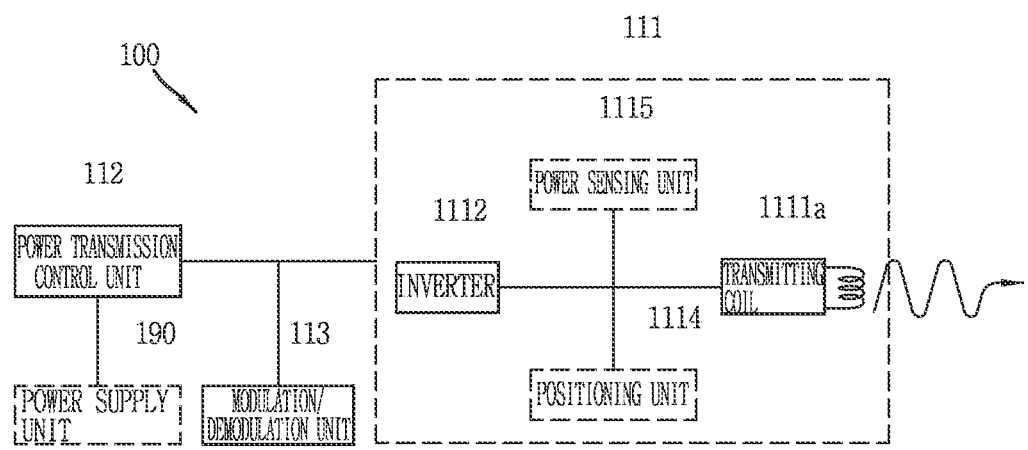
FIGS. 4A and 4B are a block diagram illustrating part of the wireless power transmitter and wireless power receiver in a magnetic induction method that can be employed in the embodiments disclosed herein.
Figure 4B:
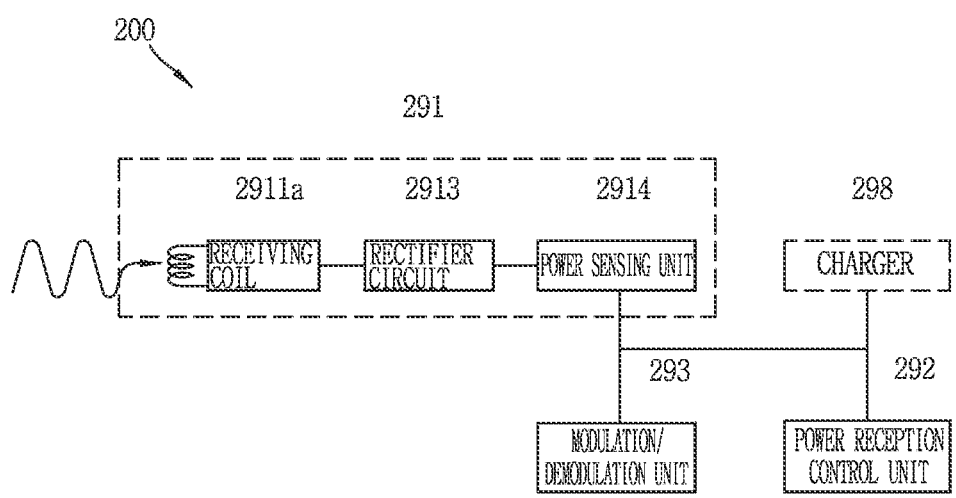

FIG. 4 is a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
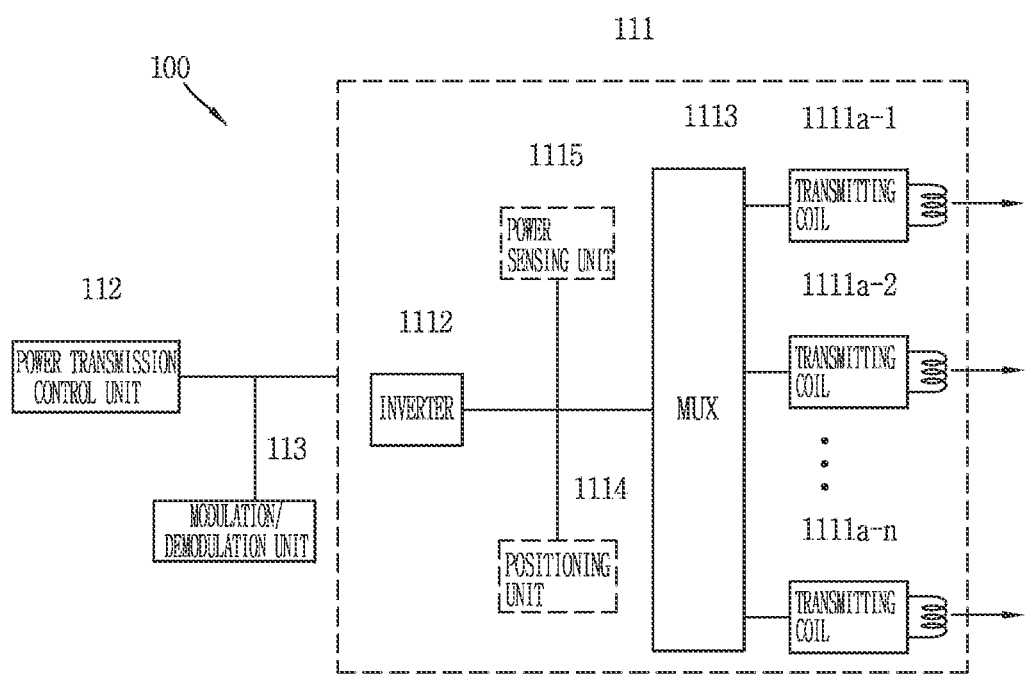
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
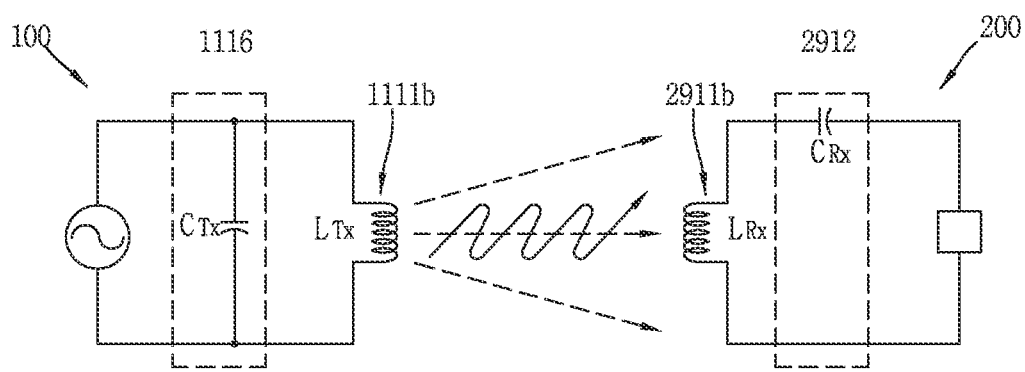
FIG. 6 is a view illustrating a concept in which power is transferred to a wireless power receiver from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{RX}$ of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

Figure 7A:
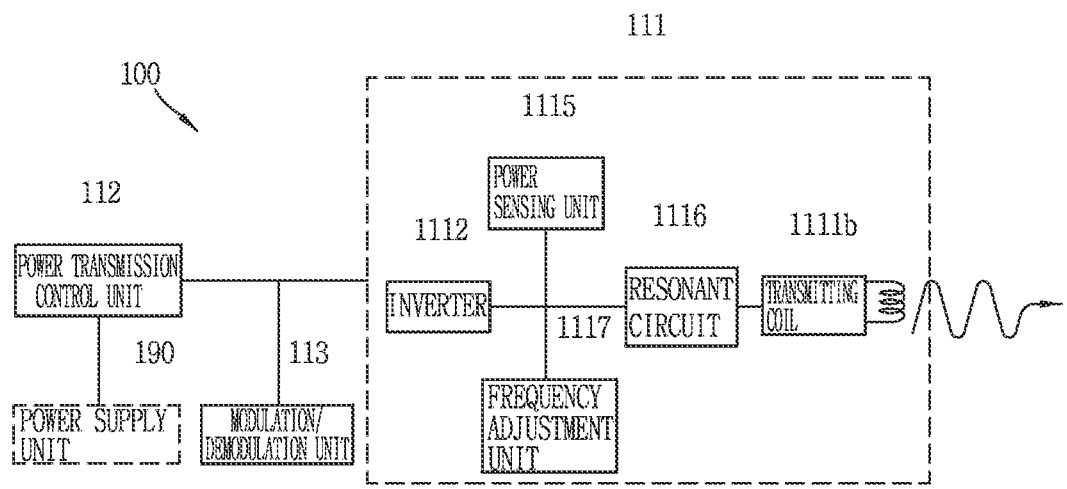
FIGS. 7A and 7B are a block diagram illustrating part of the wireless power transmitter and wireless power receiver in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
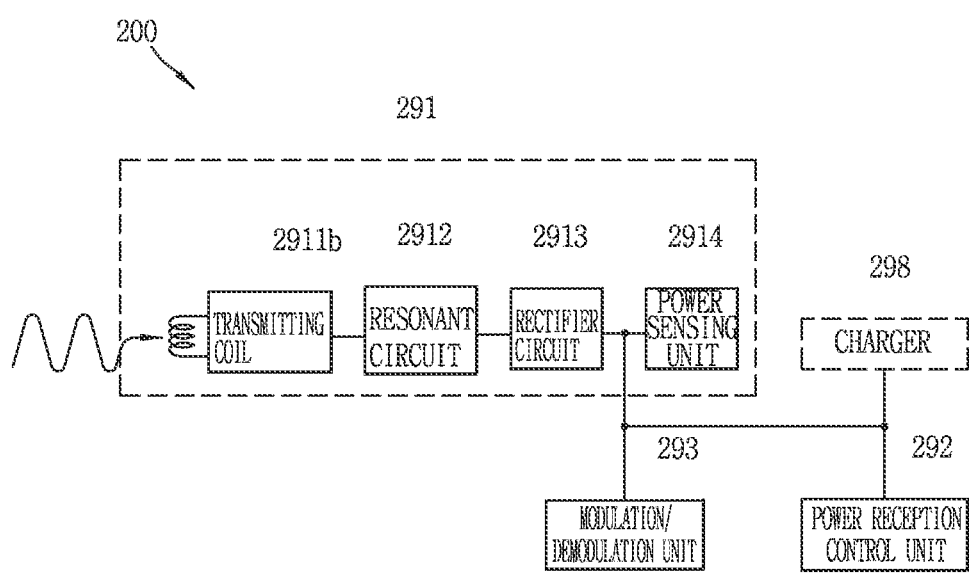

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Dower Transmitter Configured to Include One or More Transmitting Coils

Figure 8:
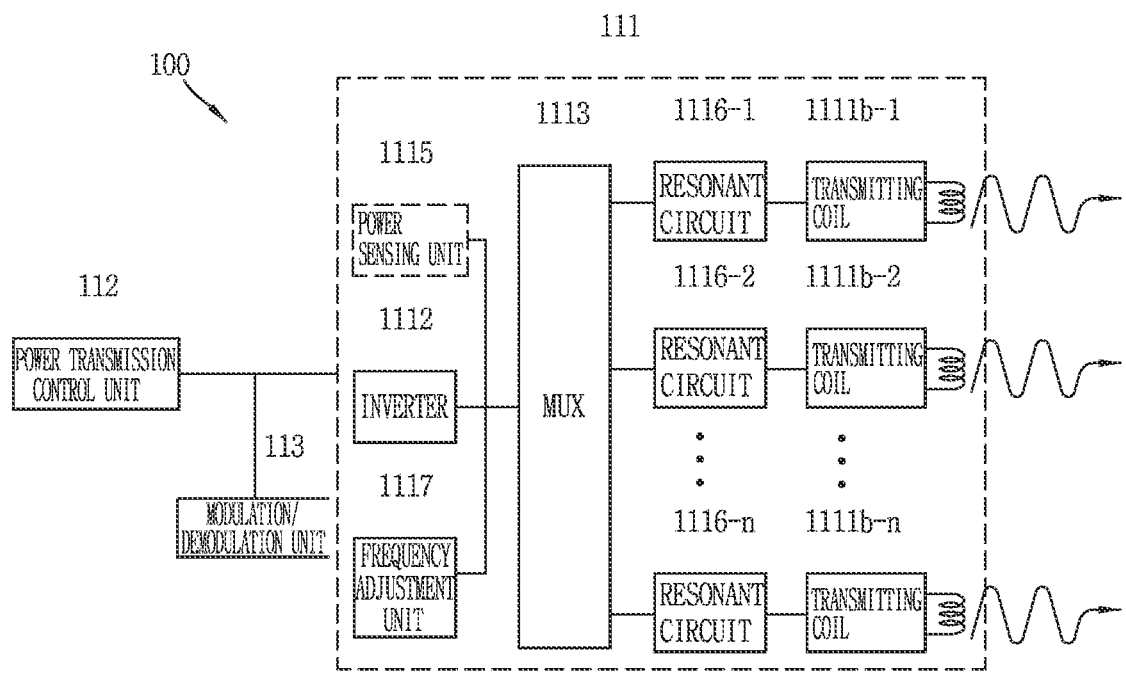
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
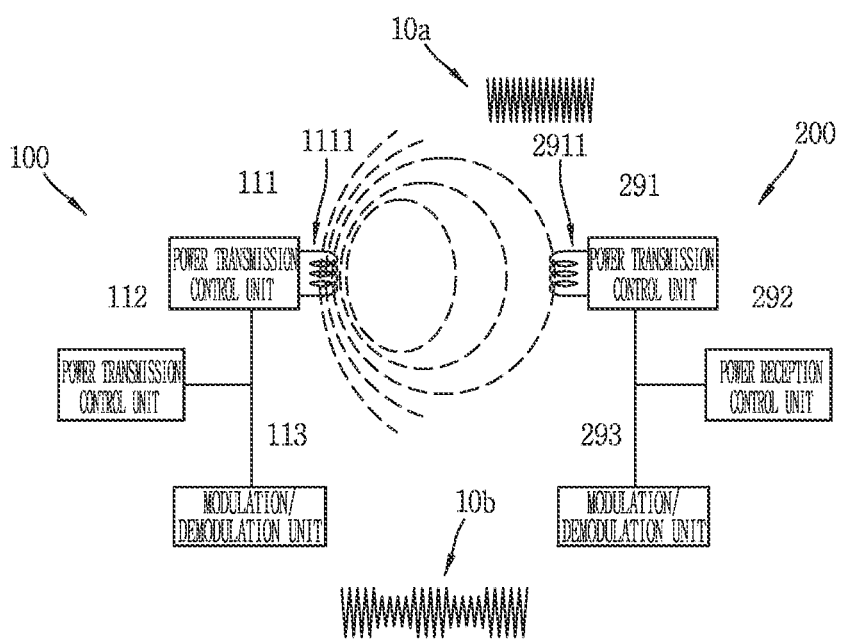
FIG. 9 a view illustrating a concept of transmitting and receiving a packet between a wireless power transmitter and an electronic device through the modulation and demodulation of a wireless power signal in transferring power in a wireless manner disclosed herein.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
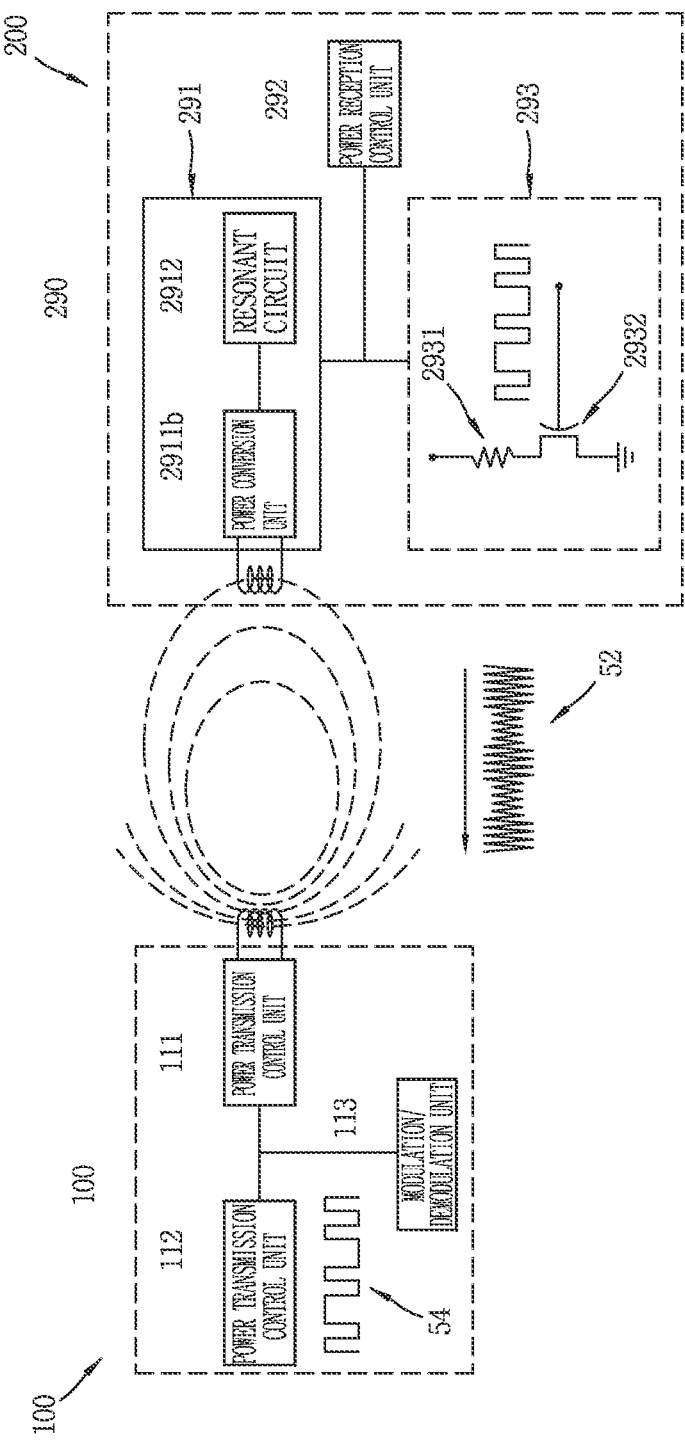
FIG. 10 is a view illustrating a configuration of transmitting and receiving a power control message in transferring power in a wireless manner disclosed herein'

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting in-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

Figure 12:
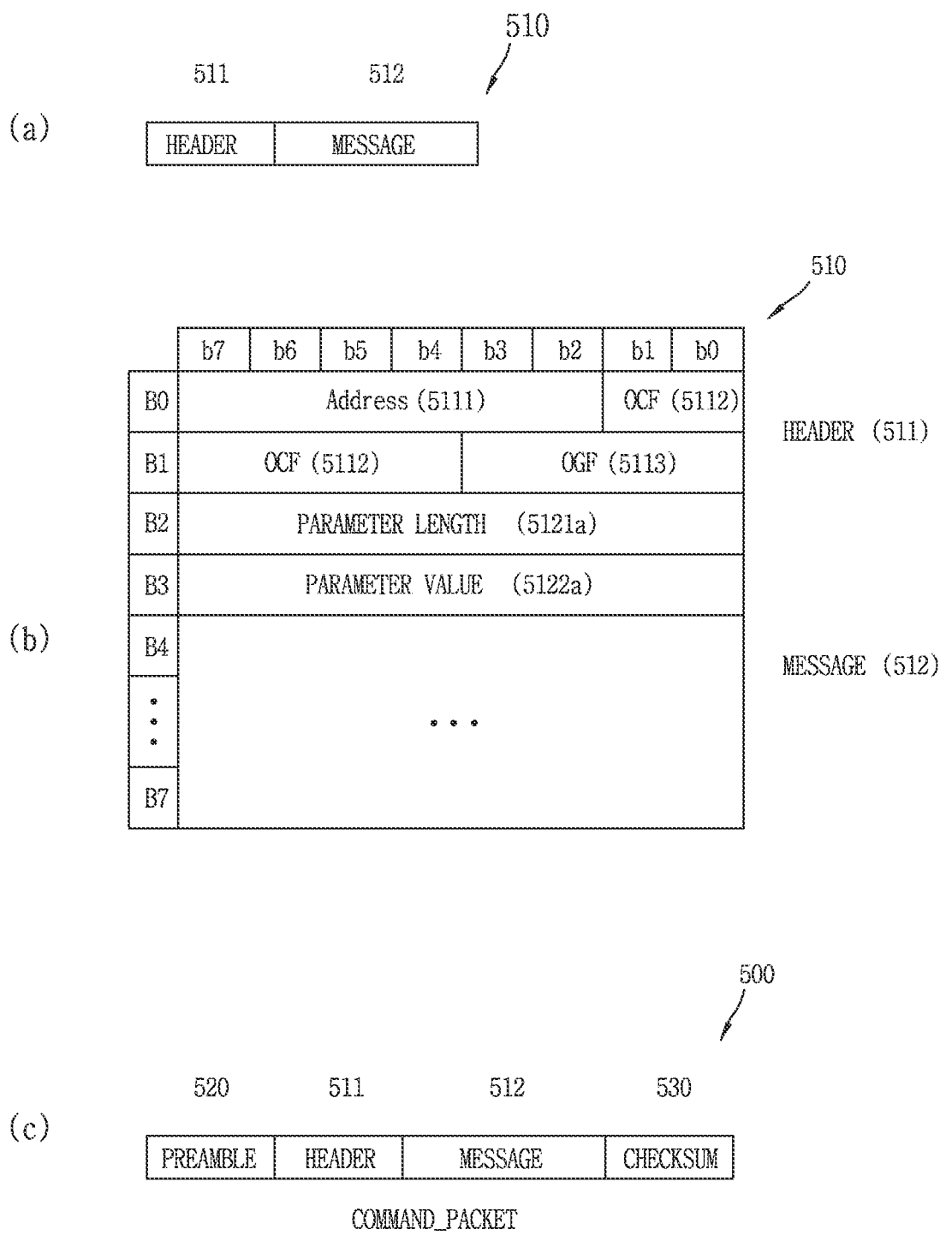

FIG. 12 is a view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
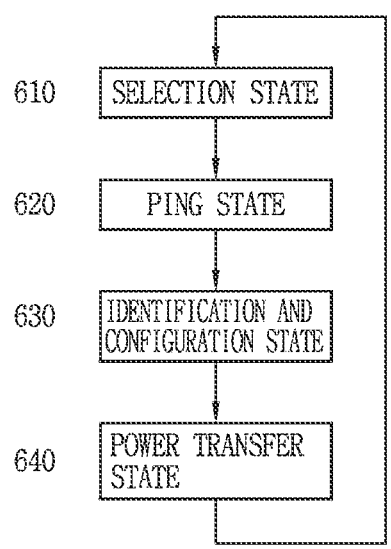
FIG. 13 is a view illustrating operation phases of the wireless power transmitter and wireless power receiver according to the embodiments disclosed herein.
Figure 14:
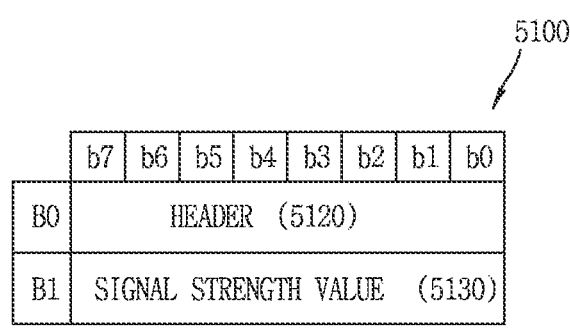

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the wireless power receiver 200 sends a response to the detection signal in the ping state 620.

Furthermore, the wireless power transmitter 100 identifies the wireless power receiver 200 selected through the previous states and acquires configuration information for power transmission in the identification and configuration state 630. The wireless power transmitter 100 transmits power to the wireless power receiver 200 while controlling power transmitted in response to a control message received from the wireless power receiver 200 in the power transfer state 640.

Hereinafter, each of the operation phases will be described in detail.

1) Selection State

The wireless power transmitter 100 in the selection state 610 performs a detection process to select the wireless power receiver 200 existing within a detection area. The detection area, as described above, refers to a region in which an object within the relevant area can affect on the characteristic of the power of the power conversion unit 111. Compared to the ping state 620, the detection process for selecting the wireless power receiver 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the wireless power receiver 200 existing within the detection area through a power control message. Compared to the detection process of the wireless power receiver 200 using a characteristic of the wireless power signal and the like in the selection state 610, the detection process in the ping state 620 may be referred to as a digital ping process.

The wireless power transmitter 100 in the ping state 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration state 630. In other words, the wireless power transmitter 100 maintains the power signal at a specific operating point subsequent to finding the wireless power receiver 200 to receive a power control message required in the identification and configuration state 630.

However, if the wireless power transmitter 100 is not able to find the wireless power receiver 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the wireless power receiver 200, thereby controlling power transmission to be effectively carried out.

The wireless power receiver 200 in the identification and configuration state 630 may transmit a power control message including its own identification information. For this purpose, the wireless power receiver 200, for instance, may transmit an identification packet 5200 including a message indicating the identification information of the wireless power receiver 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration state 630. To this end, the wireless power receiver 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0,"

reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the wireless power receiver 200 violates the limits included in the power transfer contract, then the wireless power transmitter 100 may cancel the power transmission and return to the selection state 610.

The wireless power transmitter 100 may terminate the power transfer state 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
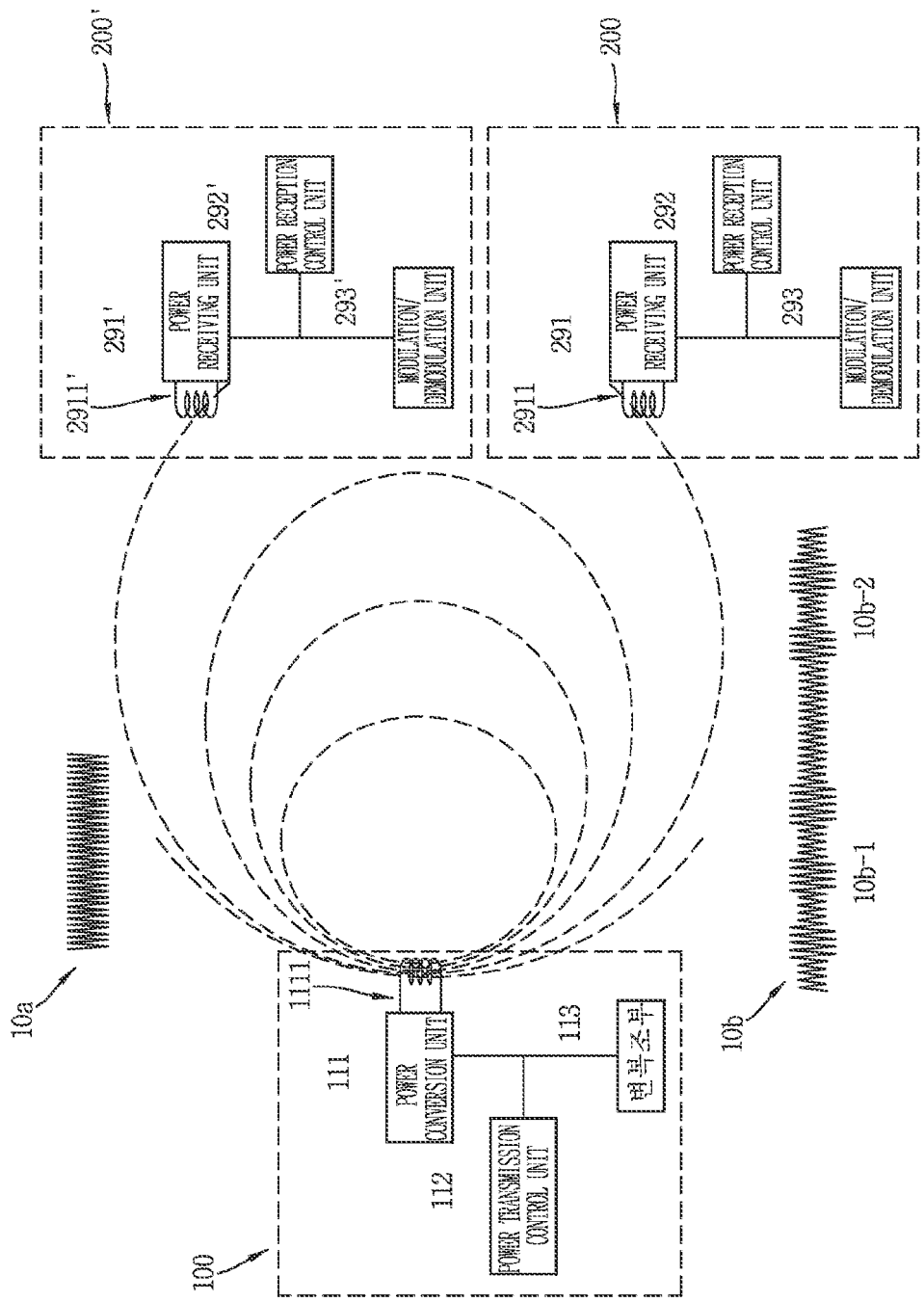
FIG. 19 is a conceptual view illustrating a method of transferring power to at least one wireless power receiver from a wireless power transmitter.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

The foregoing description has been given of the wireless power transmission and reception method based on the WPC's standard. In addition, the present disclosure proposes a method in which a wireless power transmitter wirelessly transfers power to each of wireless power receivers, which comply with (support) different standards, so as to be appropriate for each standard.

Furthermore, the present disclosure provides a new type of multi-coil solution, capable of being interoperable with a WPC standard and a PMA standard and extending a degree of position freedom of receivers. Hereinafter, detailed description thereof will be given.

Method of Extending Active Area for Interoperability of Different Standards by Assembly of Single Coils Hereinafter, description will be given of an active area extending method in a wireless power transfer method, a wireless power transmitter and a wireless charging system, with reference to FIGS. 20 to 27. In more detail, description will be given of a structure of a wireless power transmitter, which is capable of controlling two receivers supporting a Wireless Power Consortium (WPC) standard and a Power Matters Alliance (PMA) standard in a manner of assembling single coils, and a coil controlling method.

WPC and PMA standards are standards which are the most widely used in recent time among magnetic induction type wireless charging standards. The WPC and PMA standards are the same in basic principle but different in frequency. The WPC standard generally employs a coil method, whereas the PMA standard generally uses a method of forming a pattern in a spiral coil shape by etching a printed circuit board (PCB).

However, a problem is caused in that these two types of inductive wireless charging standards are not interoperable with each other. Therefore, there is not a single type coil which simultaneously meets two different standards. Here, the PMA which has been established later has a coil standard similar to the WPC. The present disclosure provides a multi-coil solution using such similar coil standard. That is, the present disclosure proposes a multi-coil structure for a transmitter, which is interoperable with a WPC-compliant receiver and a PMA-compliant receiver.

Figure 20:
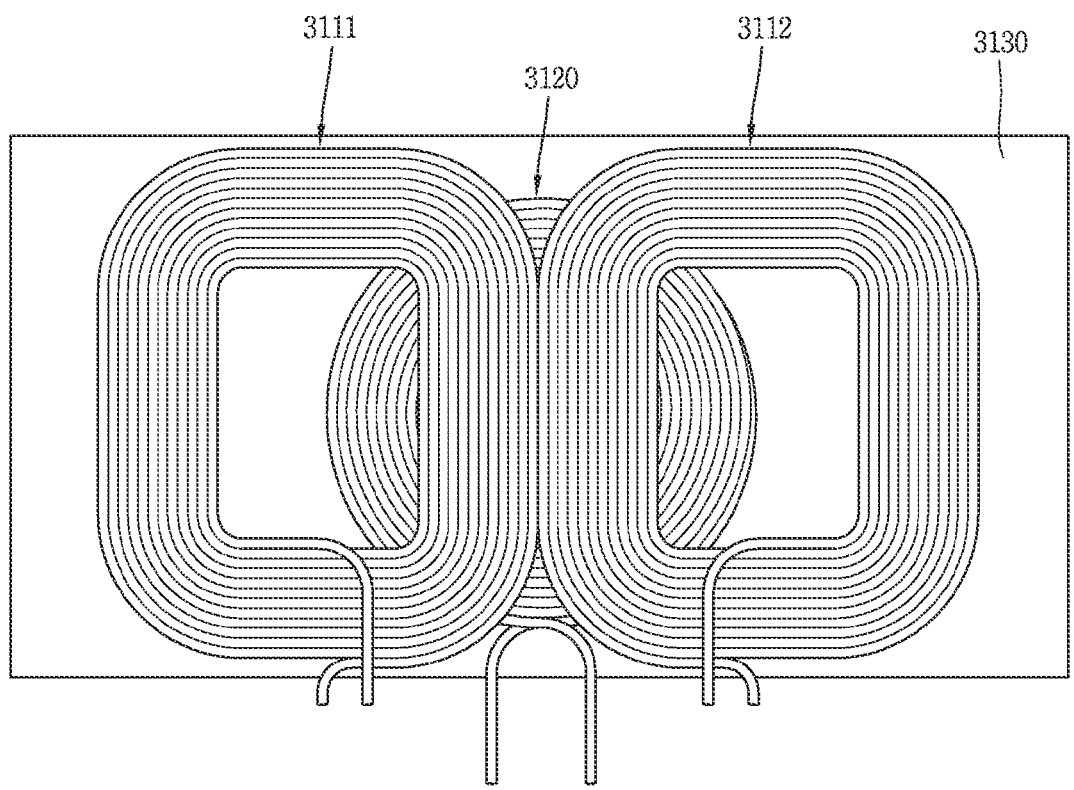
FIGS. 20 and 21 are a planar view and a front view respectively illustrating a transmission unit of a transmitter with an assembly of single coils.
Figure 21:
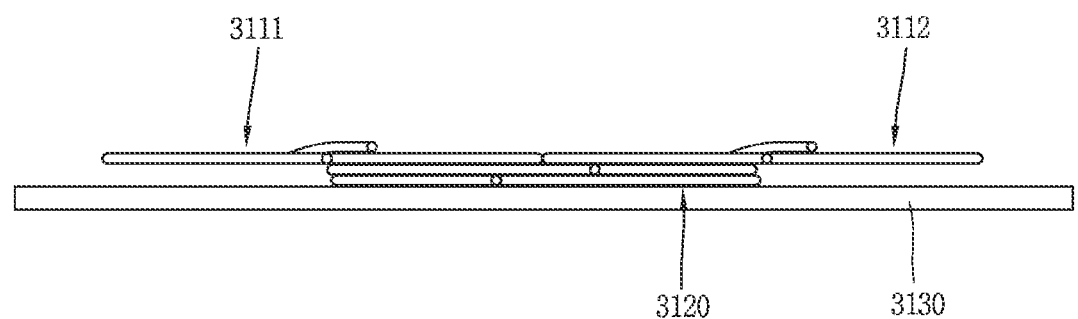
Figure 22A:
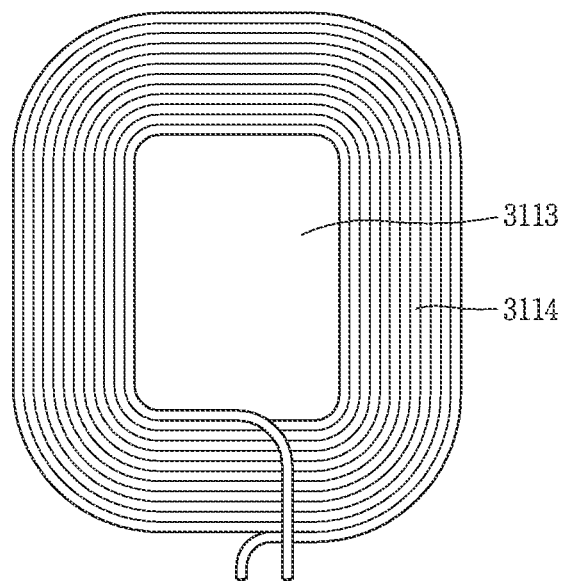
FIGS. 22A and 22B are a planar view and a front view of a first type coil illustrated in FIG. 20.
Figure 22B:
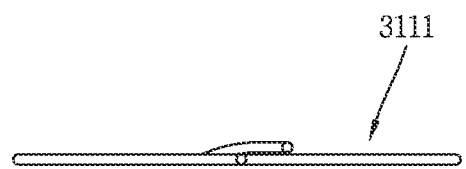
Figure 23A:
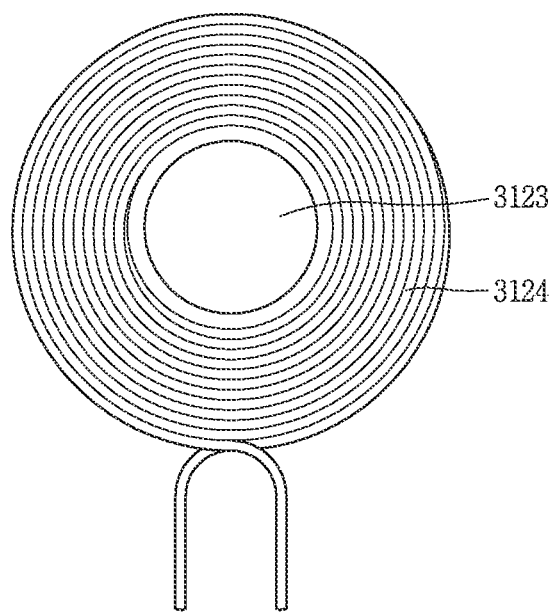
FIGS. 23A and 23B are a planar view and a front view of a second type coil illustrated in FIG. 20.
Figure 23B:
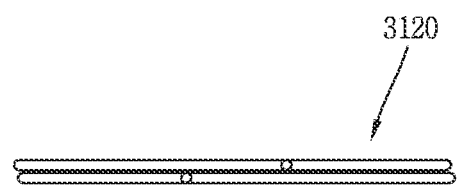
Figure 24A:
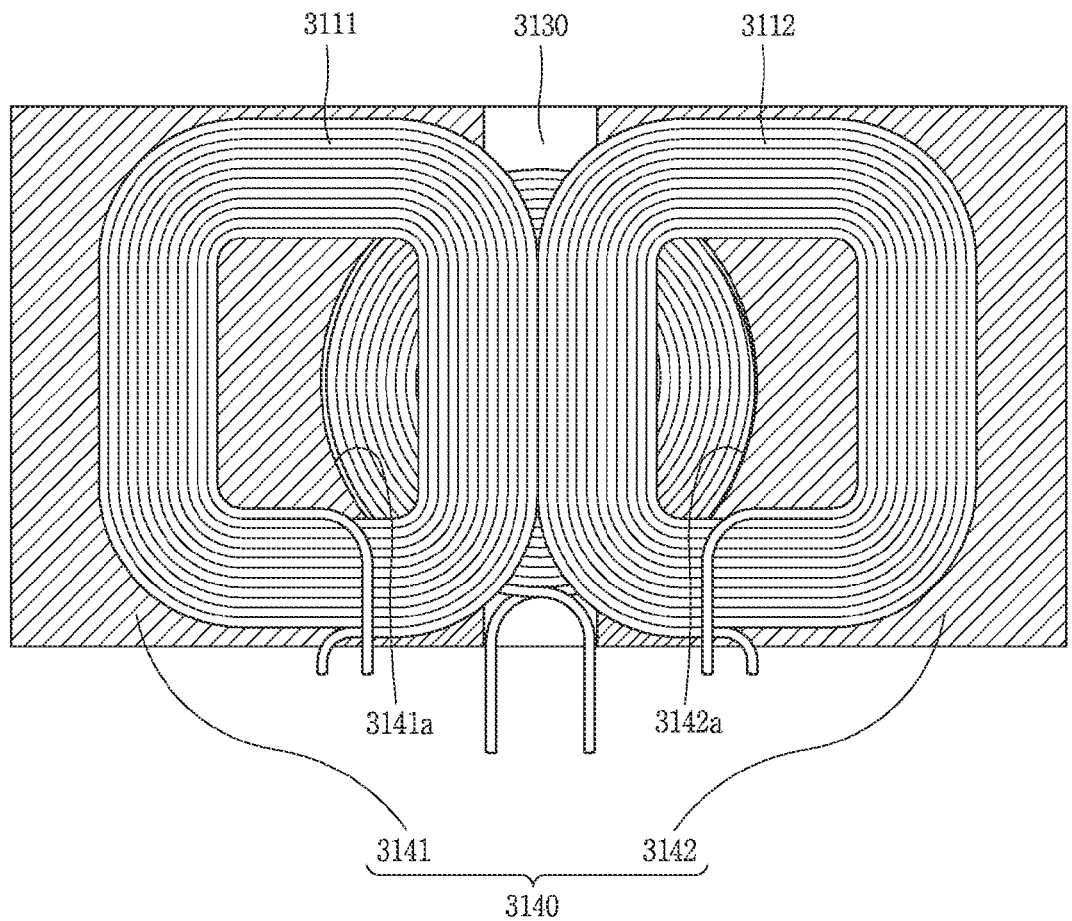
FIGS. 24A and 24B are front views illustrating an exemplary variation of the transmitter of FIG. 21.
Figure 24B:
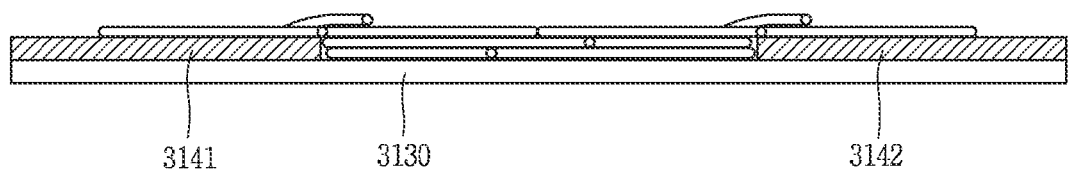

FIGS. 20 and 21 are a planar view and a front view respectively illustrating a transmission unit of a transmitter with an assembly of single coils, FIGS. 22A and 22B are a planar view and a front view of a first type coil illustrated in FIG. 20, FIGS. 23A and 23B are a planar view and a front view of a second type coil illustrated in FIG. 20, and FIGS. 24A and 24B are front views illustrating an exemplary variation of the transmitter of FIG. 21.

As illustrated in FIGS. 20 and 21, a wireless power transmitter may include a first coil 3111, a second coil 3112, and a third coil 3120.

The first coil 3111 is a coil for converting a current into a magnetic flux, and may be wound into a quadrilateral shape in which at least part is straight (linear). As one example, the first coil 3111 may be a coil wound into a rectangular (or square) shape. The second coil 3112 may be adjacent to the first coil 3111 on a plane, and have the same shape as the first coil 3111. Also, the first coil 3111 and the second coil 3112 may be disposed on the same plane.

In more detail, the second coil 3112 may be a coil which is wound into a rectangular shape, as the same as the first coil 3111. The first coil 3111 and the second coil 3112 are the same type of coil, but the third coil 3120 has a different shape from the first coil 3111 and the second coil 3112. Therefore, the third coil 3120 may be referred to as a first type coil and the first coil 3111 and the second coil 3112 may be referred to as second type coils.

As illustrated in FIGS. 22A and 22B, the second type coils may consist of a single layer. For example, the second type coils may be wound into a rectangular shape and form a single layer on a plane. As such example, the second type coil may be a coil compliant with the WPC standard.

In more detail, the second type coil may be a wire-wound type and consist of no. 17 AWG (1.15 mm diameter) type 2 litz wire having 105 strands of no. 40 AWG (0.08 mm diameter). The second type coil may be a coil that such wire is wound into a rectangular shape according to WPC-compliant A6 or A13 and consists of a single layer.

The second type coil may include a central area 3113 which is an empty space without a coil formed therein, and a coil area 3114 which is formed along an outer circumference of the central area 3113 and wound with a coil.

For example, an outer length of the coil (i.e., a length of an outer base of a rectangle) may be 53.2±0.5 mm, an outer width (i.e., a length of an outer side of the rectangle) may be 45.2±0.5 mm, an inner length (i.e., a length of a base of the central area) may be 27.5±0.5 mm, and an inner width (i.e., a length of a side of the central area) may be 19.5±0.5 mm. Also, a thickness of the coil may be 1.5±0.5 mm, and the wire may be wound 12 times on the single layer.

Referring back to FIGS. 20 and 21, the third coil 3120 may be arranged such that at least part thereof overlaps the first coil 3111 and the second coil 3112, respectively. In more detail, the third coil 3120 may be arranged such that a center thereof is located between the first coil 3111 and the second coil 3112 to overlap both of the coils.

In this case, an outer side of the first coil 3111 and an outer side of the second coil 3112 may be arranged in parallel to each other. Also, the first coil 3111 and the second coil 3112 may be formed such that outer sides of the rectangular shapes come in contact with each other. The third coil 3120 may be arranged between centers of the first coil 3111 and the second coil 3112. For example, the assembly of the first coil 3111, the second coil 3112 and the third coil 3120 may have a symmetrical shape based on the center of the third coil 3120. According to the structure, an overlapped size between the third coil 3120 and the first coil 3111 may be the same as an overlapped size between the third coil 3120 and the second coil 3112.

The assembly of the coils disclosed herein may be a multi-coil that the first type coil and the second type coils overlap each other.

As illustrated in FIGS. 23A and 23B, the first type coil may be formed to have a plurality of layers. For example, the first type coil may be wound into a circular shape and consist of multiple layers. As one example, the first type coil may be a coil compliant with the WPC standard.

In more detail, the first type coil may be a wire-wound type, and consist of no. 17 AWG (1.15 mm diameter) type 2 litz wire having 105 strands of no. 40 AWG (0.08 mm diameter), as the same as the second type coil. For example, the first type coil may be a wire-wound type and consist of no. 17 AWG (1.15 mm diameter) type 2 litz wire having 105 strands of no. 40 AWG (0.08 mm diameter), according to a WPC-compliant A1 or A17. The first type coil may be a coil that such wire is wound into a circular shape and consists of a plurality of layers. To form a plurality of layers, the first type coil may be connected at an inner side thereof and wound into two layers.

As illustrated, the first type coil may include a central area 3123 which is an empty space without a coil formed therein, and a coil area 3124 formed along an outer circumference of the central area 3123 and wound with a coil. The coil area 3124 may be made of a winding coil which is warped (a shape of a Greek alphabet 'α') into two layers, and the central area 3123 may be empty. However, the present disclosure may not be limited to this. The first type coil may be implemented into a shape stacked on the PCB into two layers, and a magnet may be disposed in the central area 3123.

An outer diameter of the coil (i.e., a diameter of an outer circle), for example, may be 43±0.5 mm, and an inner diameter (i.e., a diameter of the central area) may be 20.5±0.5 mm. Also, a thickness of the coil may be 2.1±0.5 mm, and the wire may be wound 10 times per one layer to form two layers.

In such a manner, the first type coil may be formed similar to a PMA-compliant coil. It can thusly be understood that the third coil 3120 is a coil which complies with (or supports) both the WPC and PMA standards. The present disclosure uses the first type coil as a coil interoperable with the WPC and PMA standards.

Referring back to FIGS. 20 and 21, the first coil 3111 and the second coil 3112 may be stacked on one surface of the third coil 3120. That is, the first type coil may be arranged beneath the second type coils.

Since the first type coil is made by winding a wire of the same thickness into two layers, it may be thicker than a rectangular coil wound into a single layer. A distance from a transmitting coil to a surface of a charger is generally limited to 3 mm. Therefore, as a structural method for overlapping a charging area, the thick first type coil may be disposed beneath the second type coils so as to maintain the distance from the transmitting coil to the surface. Also, in order to overlap the first type coil without separation of the charging area, the second type coils may be formed in the rectangular shape. Specifically, only when inner regions of the coils are fully overlapped, the charging area is not separated. Therefore, this exemplary embodiment illustrates that the rectangular coils are adjacent to each other and a center of the circular coil is disposed at a boundary between the rectangular coils.

As illustrated, a shielding member 3130 may be disposed on the other surface (an opposite surface to the surface on which the first and second coils are disposed) of the third coil 3120. That is, the shielding member 3130 may be disposed beneath the first type coil.

The shielding member 3130 may be disposed more adjacent to the third coil 3120 than the first coil 3111 and the second coil 3112 so as to prevent a generated magnetic field from being transferred to a base station.

In this case, the base station may be a body of a portable electronic device, a charging cradle of a vehicle, and the like. The base station is a device which can provide near field inductive power, and may have an active area. The active area may be a part of an interface surface of the base station, through which a magnetic flux flows, when the base station supplies power to the portable electronic device or the charging cradle. In this case, a distance from the transmitting coil (the first coil, the second coil and the third coil) to one surface (the interface surface) of the base station may be 3.0±0.5 mm.

The shielding member 3130 may protect devices (for example, a microprocessor) mounted on a PCB from an electromagnetic affection caused due to an operation of the transmitting coil, or protect the transmitting coil from an electromagnetic affection caused due to operations of the devices mounted on the PCB.

The shielding member 3130 may overlap the transmitting coil. For example, the shielding member 3130 may be formed between a case of the base station and the transmitting coil.

The shielding member 3130 may be formed such that at least part thereof exceeds an outer diameter of an outer circle of the third coil. For example, the shielding member 3130 may extend from the outer diameter of the outer circle by at least 2 mm, and be disposed beneath the third coil by a distance of 1.0 mm in maximum.

According to the structure, the rectangular coil which is spaced apart from the shielding member, as compared with the circular coil which is adhered right on the shielding member, may have a reduced inductance. Therefore, the structure of this embodiment may be varied as illustrated in FIGS. 24A and 24B. FIGS. 24A and 24B are a planar view and a front view illustrating an exemplary variation of the transmitter of FIG. 21.

As illustrated in FIGS. 24A and 24B, an auxiliary shielding member 3140 may be disposed between the first coil 3111 and the second coil 3112 and the shielding member 3130.

The auxiliary shielding member 3140 may provide a 2-layer shielding structure such that different types of coils (the first type coil and the second type coils) have standard-compliant inductances, respectively. The auxiliary shielding member 3140 may include first and second auxiliary shielding members 3141 and 3142. The first and second auxiliary shielding members 3141 and 3142 may be disposed adjacent to each other on the same plane. The first and second auxiliary shielding members 3141 and 3142 may be made of the same material in the same shape. Also, the first and second auxiliary shielding members 3141 and 3142 may be provided, respectively, with a first groove 3141a and a second groove 3142a which are semicircular to correspond to the circular shape of the third coil 3120. In this case, detailed design numerical values of the first and second auxiliary shielding member 3141 and 3142 may be decided according to an experiment such that the first type coil and the second type coils have inductances compliant with standards, respectively.

The multi-coil solution disclosed herein may use the assembly of the single coils, which complies with (or supports) the two different standards. Accordingly, the multi-coil solution may allow for using (supporting) both of two standards of the receiver and extending the active area.

In addition, the present disclosure may be configured to operate the wireless power transmitter in such a manner that a controller detects a standard applied to the receiver, and determines a coil to be driven among the first coil, the second coil, and the third coil using the detected standard. Hereinafter, the operating method will be described in more detail.

Figure 25:
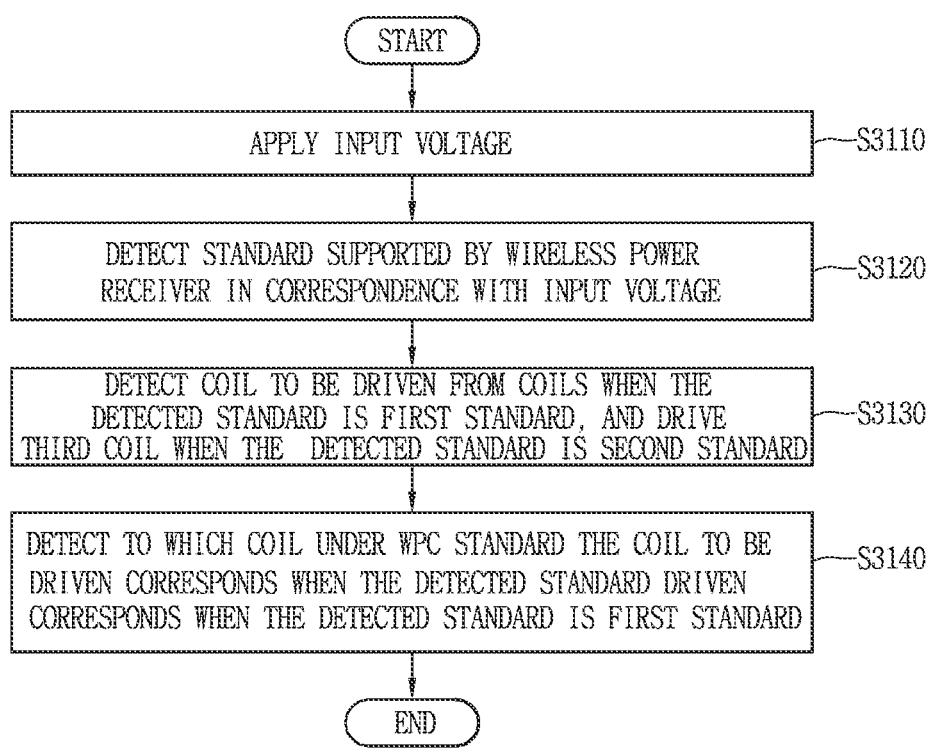
FIG. 25 is a flowchart illustrating a method for driving (operating) a transmitter.
Figure 26:
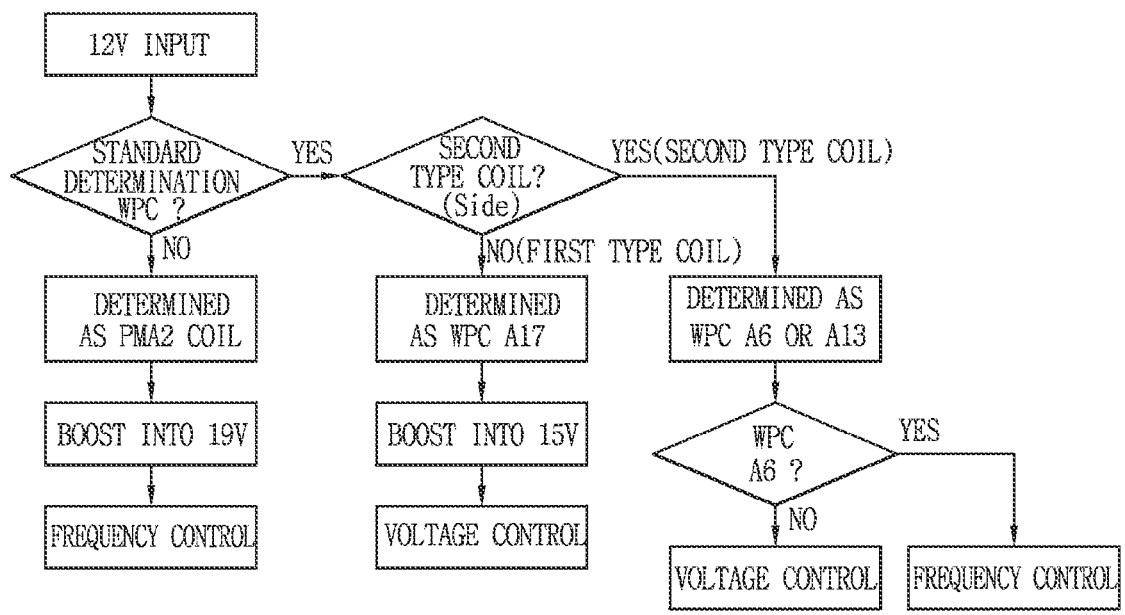
FIG. 26 is a detailed flowchart illustrating one embodiment of the operating method of FIG. 25.

FIG. 25 is a flowchart illustrating a method for driving (operating) a transmitter, and FIG. 26 is a detailed flowchart illustrating one embodiment of the operating method of FIG. 25.

According to the operating method, a controller of a transmitter may apply an input voltage to at least one of the first, second and third coils (S3110). In this case, the applied input voltage may be 12V. Next, the controller may detect a standard which a wireless power receiver complies with (or supports), in correspondence with the input voltage (S3120). The detection of the standard may be carried out by the controller of the transmitter through communication with the receiver according to a WPC or PMA communication standard.

Here, the controller may detect a coil to be driven from the first, second and third coils if the standard is a first standard, and drive the third coil if the standard is a second standard. (S3130). In this case, the first standard may be a WPC standard and the second standard may be a PMA standard. However, the present disclosure may not be limited to this. The first and second standards may be other standards except for the WPC and PMA standards.

In addition, if the standard is the first standard, then the controller may detect whether the coil to be driven is a coil wound into a quadrilateral shape or a coil wound into a circular shape in compliance with the first standard (S3140). In more detail, if the standard is the first standard, the controller may detect whether the coil to be driven is a WPC-compliant A6 or A13 coil or a WPC-compliant A17 coil. Afterwards, the controller may control one of the first, second and third coils to transfer power in a wireless manner according to the detection result.

In this case, since the third coil is the coil which is interoperable with the first standard or the second standard, the controller may selectively apply one of a plurality of voltages to the third coil. In more detail, the controller may apply a voltage corresponding to a size of an input voltage to at least one of the first, second and third coils. After detecting the standard, the controller may boost or maintain the input voltage to be compliant with the standard.

For example, if the standard is the first standard, the controller may determine one coil to control from the first, second and third coils. If the standard is the second standard, the controller may boost the input voltage applied to the third coil and carry out a frequency control.

In this case, it may be set that the first coil and the second coil are coils to which the input voltage is applied and a voltage higher than the input voltage is applied to the third coil under the first standard. Also, the first coil and the second coil may be coils for which a frequency control or a voltage control is carried out under the first standard, and the third coil may be a coil for which the voltage control is carried out under the first standard. For example, the first, second and third coils may be the coils named equally as described with reference to FIGS. 20 to 24B.

Hereinafter, the operating method will be described in more detail, with reference to FIG. 26.

First, the controller may apply an input voltage of 12V to a coil to detect whether the receiver supports the first standard. If a signal compliant with the first standard sent from the receiver has not been received, the controller may determine that the receiver supports the second standard. Afterwards, the controller may boost the voltage applied to the first type coil into a voltage higher than the input voltage. For example, the controller may boost the input voltage into 19V and thereafter transfer power in a wireless manner through the frequency control. In such a manner, the controller may boost the input voltage and carry out the frequency control when the detected standard is the second standard.

On the other hand, if the signal compliant with the first standard is received from the receiver, the controller may determine whether the coil of the receiver is the first type coil or the second type coil. The determination may be made according to a communication protocol of the first standard.

If the coil of the receiver is the first type coil, the controller may determine the coil of the receiver is the coil which is wound into a circular shape in compliance with the first standard and thereafter boost the voltage applied to the first type coil into a voltage higher than the input voltage. The coil wound into the circular shape may be the WPC-compliant A1 or A17 coil, for example. As one example, the voltage applied to the third coil may be 15V, and power may be wirelessly transferred through the voltage control (voltage & frequency).

In this case, if the coil of the receiver is the second type coil, the controller may determine which one of the coils wound into the rectangular shape in compliance with the first standard corresponds to the coil of the receiver. The coil wound into the circular shape may be the WPC-compliant A6 or A13 coil, for example. If a coil to be driven is the A17 coil, the controller may boost the input voltage. If the coil to be driven is the A6 or A13 coil, the controller may maintain the input voltage. For example, while maintaining the size of the input voltage, the controller may carry out the frequency control (or a frequency & duty cycle control) with respect to at least one of the first and second coils when the coil is determined as the WPC-compliant A6, and carry out the voltage control (or a voltage & frequency control) when the coil is determined as the WPC-compliant A13 of the standard.

As such, in a manner that an operation voltage of the first type coil which is interoperable with the WPC and PMA standards is higher than that of the second type coil which is dedicated for the WPC standard, the standard of the receiver can be detected by a low voltage.

According to the foregoing processes, an operating method for a transmitter which is operated to be interoperable with a plurality of standards may be implemented by using the multi-coil structure described with reference to FIGS. 20 to 24B.

Figure 27:
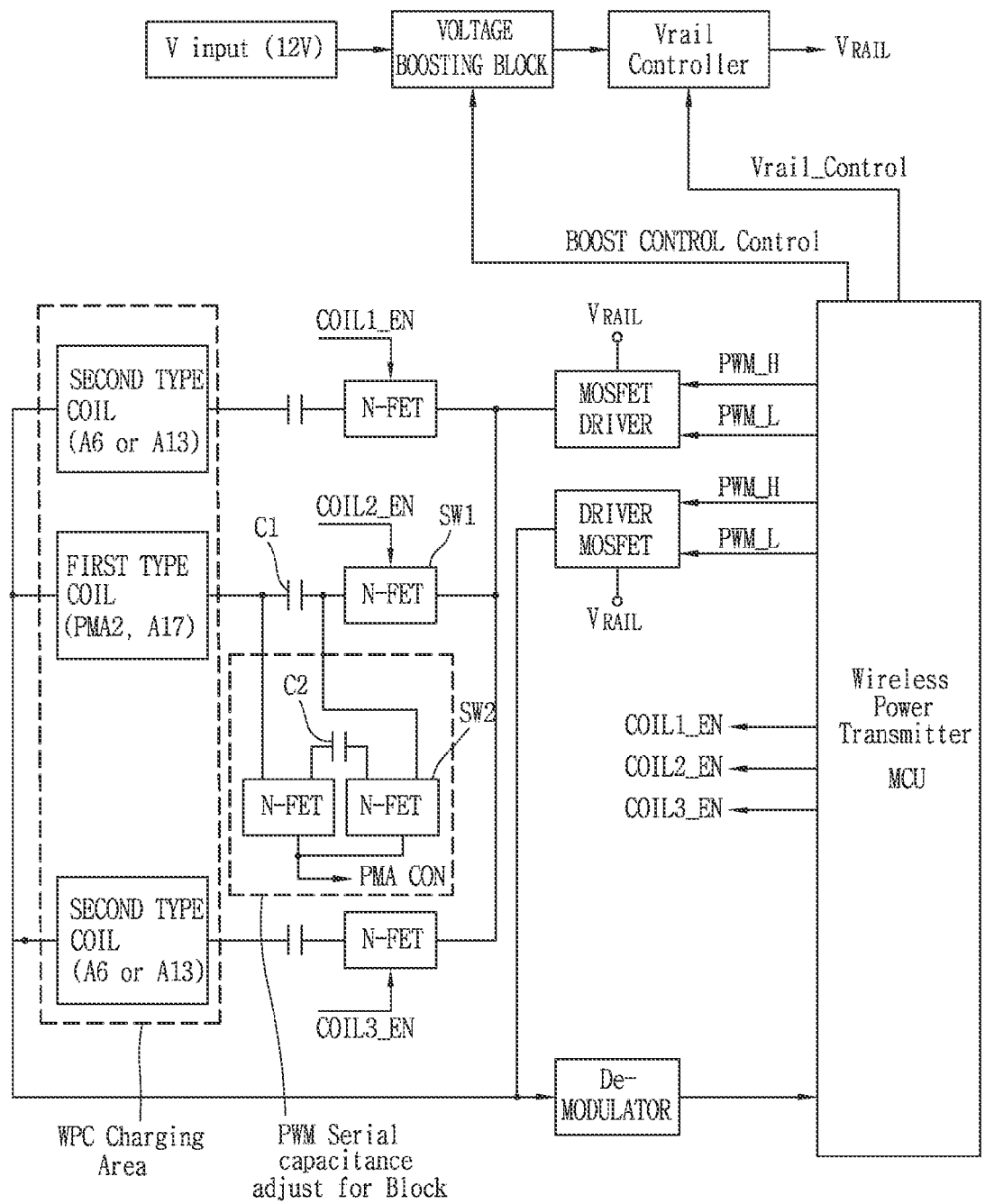
FIG. 27 is a structural view of a circuit implementing the operating method of FIG. 26.

Hereinafter, description will be given of a circuitry construction which can support the operating method for the transmitter. FIG. 27 is a structural view of a circuit implementing the operating method of FIG. 26.

As illustrated in FIGS. 20 to 24B, the coil wound into the circular shape in compliance with the first standard is employed as the first type coil which is a center coil, and the coil wound into the rectangular shape appropriate for an input voltage of 12V is employed as the second type coil which is both of side coils. For example, the first type coil as the center coil may be the WPC-compliant A17 coil, and the second type coil as the side coils may be the A6 or A13 coils appropriate for the input voltage of 12V.

With respect to the input voltage of 12V for operating the coils, the controller may decide a control method according to which receiver (a PMA-compliant receiver or a WPC-compliant receiver) is placed on which coil. In this case, the controller may be implemented as a type of microcomputer (or a micro controller unit (MCU)).

For example, for the first type coil, a size of a voltage may be changed from 15V into 19V in a manner of executing a boost control for a voltage boost block. In this case, the voltage size by the voltage control may be adjusted according to a DA value of the MCU through Vrail control.

A PMA-compliant operation may serve to switch a frequency when the first type coil is operated as a PMA coil (for example, PMA 2) or the second type coil is operated as a WPC A6 coil.

As illustrated, the controller may control a driving circuit unit. The driving circuit unit may include a first switch SW1 connected to a first capacitor C1, and a second switch SW2 connected to a second capacitor C2. The first capacitor C1 and the second capacitor C2 may be connected to the first type coil (or the third coil) in parallel. The first and second switches SW1 and SW2 may be controlled to apply one of a plurality of voltages to the first type coil (or the third coil) according to whether the standard is the WPC standard or the PMA standard.

If the receiver supports the WPC standard, the first switch SW1 may be turned on (closed) and the second switch SW2 may be turned off (opened) such that the first capacitor C1 is electrically connected to the first type coil (or the third coil). In this case, the first capacitor C1 may be configured to correspond to a circuit standard of the WPC-compliant A17 coil.

The A17 coil may be configured such that an operating frequency thereof is f=105 to 116 kHz with a duty cycle of 50%, the total serial capacitance in a configuration of a full-bridge inverter is C=100±5% nF, and parallel capacitance is C=200±5% nF. The regulation of the capacitance is different from the PMA regulation. This exemplary embodiment may provide a circuit view of varying capacitance.

As illustrated, if the receiver supports the PMA standard, the first switch SW1 may be turned off (opened) and the second switch SW2 may be turned on (closed) such that the second capacitor C2 is electrically connected to the first type coil (or the third coil). In this case, the second capacitor C2 may be configured to correspond to the PMA-compliant coil.

According to the circuit configuration, all of the three coils may support the WPC-compliant receiver, and the center coil may support the PMA-compliant receiver.

Hereinafter, description will be given of another structure of a transmitter which can transfer power in a wireless manner to every receiver compliant with two different standards.

The present disclosure may provide a transmitter which is capable of wirelessly transmitting power in a manner of controlling a transmitter to support (or be appropriate for) a resonant frequency of the transmitter and two different standards. In more detail, the present disclosure provides a wireless power transmitter allowed for a frequency conversion using the point that most regulations are the same or similar but frequency bands used are different in view of the WPC and PMA standards.

Figure 28:
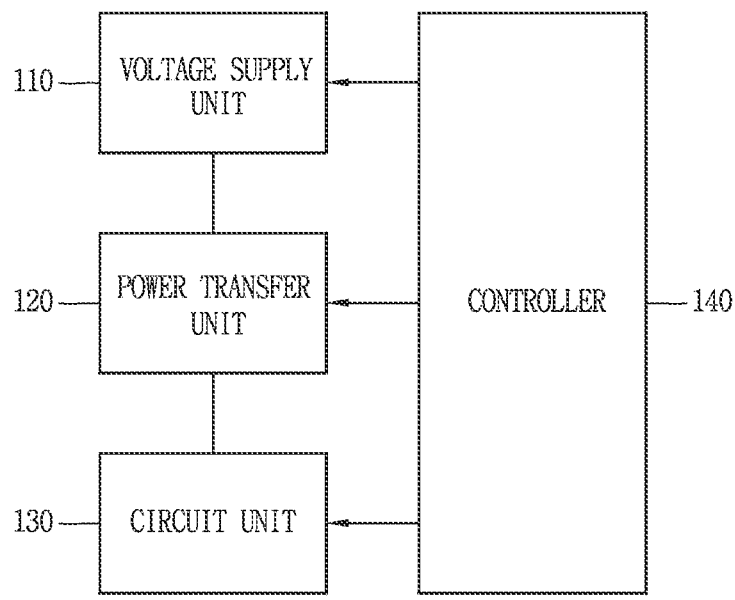
FIGS. 28 and 29 are a block diagram of a wireless power transmitter, and a flowchart illustrating a method of operating the transmitter to transmit power in a wireless manner to a receiver supporting two different standards.
Figure 29:
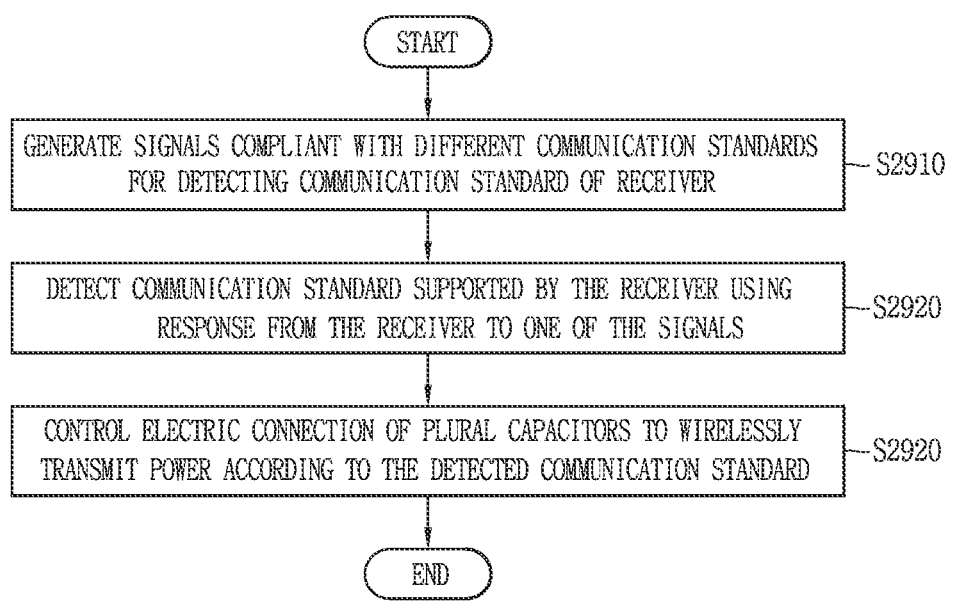
Figure 31:
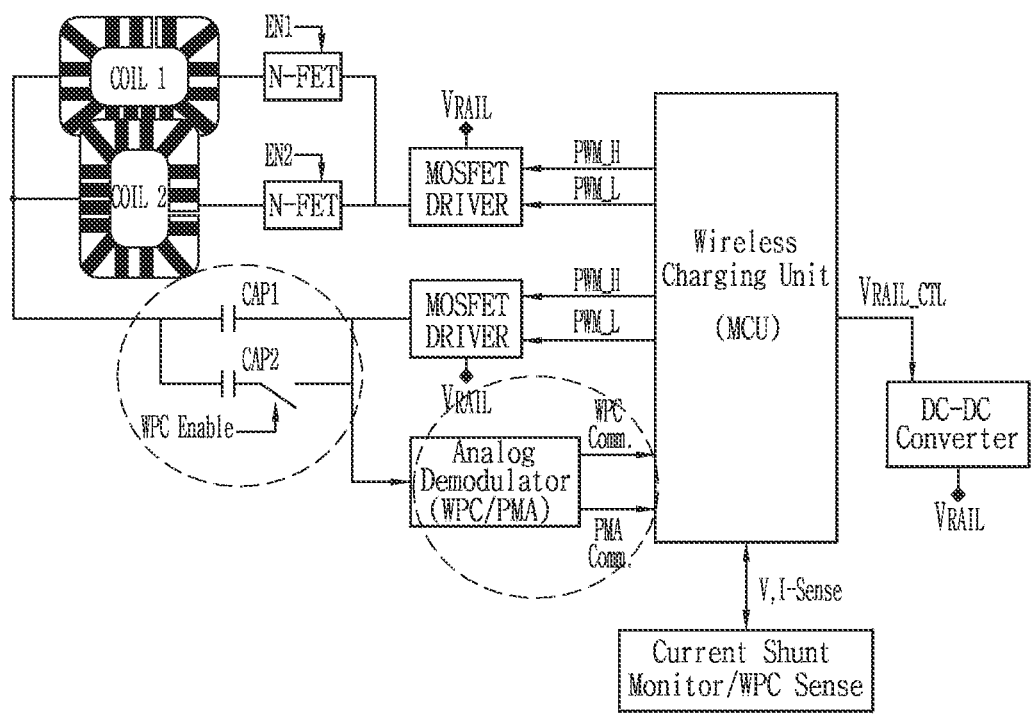
FIG. 31 is a structural view of a circuit implementing a method of wirelessly transferring power in a wireless power transmitter to be compliant with different standards.

FIGS. 28 and 29 are a block diagram of a wireless power transmitter, and a flowchart illustrating a method of operating the transmitter to transmit power in a wireless manner to a receiver supporting two different standards, FIG. 30 is a conceptual view illustrating a coil useable in a wireless power transmitter, and FIG. 31 is a structural view of a circuit implementing a method by which a wireless power transmitter transmits power in a wireless manner to be compliant with (be appropriate for, support, or be interoperable with) different standards.

Hereinafter, description will be given of a method of transferring power in a wireless manner by a wireless power transmitter.

First, a transmitter disclosed herein may generate signals complying with different standards in a sequential manner, in order to detect a standard that a receiver supports (S2910). Here, the signals may be sequentially generated in an alternating manner with preset intervals.

In more detail, the transmitter disclosed herein may sequentially generate a first signal compliant with the WPC standard and a second signal compliant with the PMA standard in an alternating manner.

Afterwards, the transmitter may detect a communication standard that the receiver supports, using a receiver's response to one of the generated signals (S2920).

In more detail, if the receiver receives a signal which is appropriate for its standard among the signals generated by the transmitter, the receiver may transmit a power control message. The power control message may be information including at least one characteristic of frequency, voltage and current by which the transmitter operates. Here, the transmitter which has received the power control message may detect the standard that the receiver supports, based on the information included in the power control message.

When the receiver's standard is detected, the transmitter may control an electric connection of a plurality of capacitors included in a circuit unit 130 such that power can be wirelessly transferred according to the detected standard (S2930).

In more detail, since the WPC communication standard and the PMA communication standard use different frequency bands from each other, the transmitter may change its operating frequency band such that the different standards can be supported. That is, the WPC communication standard uses a frequency band in the range of 105 to 205 kHz, and the PMA communication standard uses a frequency band in the range of 227 to 278 kHz.

Here, an assembly of a plurality of capacitors may be used to change the operating frequency band without a change of a power transfer unit 110 (for example, a coil).

For example, when the WPC communication standard is detected, the controller 140 may control the electric connection of the plurality of capacitors such that the assembly of the plurality of capacitors is 200 nF. Also, when the PMA communication standard is detected, the controller 140 may control the electric connection of the plurality of capacitors such that the assembly of the plurality of capacitors is 55 nF.

Here, the assembly of the plurality of capacitors may be changed using at least one switch which is connected to at least some of the plurality of capacitors. For example, the circuit unit 130 may include a first capacitor and a second capacitor. The first and second capacitors may be connected in parallel to each other, and a switch may be additionally connected to the second capacitor. Here, the controller 140 may change a capacitor value of the circuit unit 130 by turning on/off the switch.

In more detail, the controller 180 may turn on the switch when the communication standard is the WPC communication standard, and may not turn on the switch when the communication standard is the PMA communication standard.

When the standard that the receiver supports is detected, the controller may boost an input voltage or depressurize an input voltage of the transmitter such that the communication standard can be supported. In more detail, when the PMA communication standard is detected, the controller 140 may boost or depressurize the input voltage of the transmitter to be set into 18V. Similar to this, when the WPC standard is detected, the controller 140 may boost or depressurize the input voltage to be set to 12V.

Along with this, when the standard that the receiver supports is detected, the controller 140 may control an operating topology (for example, a communication block) of the transmitter such that the communication standard can be supported. In more detail, the control of the operating topology may be carried out in a manner of adjusting a cut-off frequency of a low pass filter. For example, the controller may adjust the cut-off frequency down to less than 5 kHz when the WPC communication standard is detected, and adjust the cut-off frequency down to less than 20 kHz when the PMA standard is detected.

Also, the wireless power transmitter for transferring power in the wireless manner may include at least one of a voltage supply unit 110 to supply a voltage, a power transfer unit 120 having at least one coil to transfer power by converting a current into a magnetic field, a circuit unit 130 connected to the power transfer unit 120 in series and having a plurality of capacitors for converting a frequency of the transmitter, and a controller 140 to control the voltage supply unit 110, the power transfer unit 120, and the circuit unit 130 to be appropriate for the standard of the receiver. In addition, the transmitter disclosed herein may further include a communication block (not illustrated).

The voltage supply unit 110 may supply power to be used by the circuit unit 130, the power transfer unit 120 and the controller 140. The voltage supply unit 110 may also supply an input voltage to be appropriate for different wireless power standards through the control of the controller 140.

The controller 140 may be implemented as a type of microcomputer (or micro controller unit (MCU)) which is formed on a PCB mounted on a portable electronic device or a charging cradle.

The controller 140 may control the power transfer unit 120 to transfer power to the receiver.

The power transfer unit 120 may include at least one coil for converting a current into a magnetic flux. The at least one coil may be a different type of coil or the same type of coil. Also, the at least one coil may have the same shape or a different shape. For example, the at least one coil may be a coil wound to form the same rectangular shape.

The at least one coil may also be disposed on a plane to be adjacent to each other. For example, the at least one coil may be disposed such that at least part thereof overlaps each other.

Also, the at least one coil may be activated in all or in part. That is, the at least one coil may be partially activated to transfer power in a wireless manner. Here, the activation of the coils indicates that the coil becomes a state in which a current transferred from the power supply unit can be converted into a magnetic field.

Here, a selection of a coil to activate may be decided based on reception or non-reception of an enable signal. The controller 140 may activate the coil in a manner of transmitting the enable signal to a coil to activate among the at least one coil. In this case, power may be transferred to the wireless power receiver through the activated coil.

Here, the controller 140 may decide a coil to receive the enable signal according to receiver-related position information included in a power transfer message, received from the receiver. For example, the controller 140 may activate a coil which is located at an area adjacent to the receiver.

In one exemplary embodiment of a coil usable in the present disclosure, the WPC-compliant A13 coil may be used. The A13 coil may be a wire-wound type and consist of no. 17 AWG (1.15 mm diameter) type 2 litz wire having 105 strands of no. 40 AWG (0.08 mm diameter). The A13 coil may have a rectangular shape and consist of a single layer.

Referring to (a) of FIG. 30, an outer length dol of the A13 coil (a length of an outer base of a rectangle) may be 53.2±0.5 mm, an outer width dow (a length of an outer side of the rectangle) may be 45.2±0.5 mm, an inner length dil (a length of a base of a central area) may be 27.5±0.5 mm, and an inner width diw (a length of a side of the central area) may be 19.5±0.5 mm. Also, a thickness of the coil may be 1.5±0.5 mm, and the wire may be wound 12 times on the single layer.

Referring to (b) of FIG. 30, the A13 coil may be arranged such that at least part of each of a plurality of coils overlaps each other. Odd-numbered coils may be disposed to overlap each other with a distance doo of 49.2±4 mm between centers of the coils. Also, an even-numbered coil may be disposed to be orthogonal to the odd-numbered coils and overlap the odd-numbered coils with a distance doe of 24.6±2 mm between centers of the even-numbered coil and the odd-numbered coil. The present disclosure may dispose the coils in the overlapping manner so as to fully prevent a charging area from being separated.

The controller 140 may change the operating frequency band of the transmitter so as to support the receiver's communication standard when the receiver's standard is detected. Here, the controller may control the electric connection of the plurality of capacitors constructing the circuit unit 130 for changing the operating frequency band.

In more detail, the circuit unit 130 may include a plurality of capacitors and at least one switch. Here, the controller 140 may change an assembly of the plurality of capacitors so as to adjust a capacitor value of the circuit unit 130.

Also, the circuit unit 130 may be electrically connected to the power transfer unit 120. In more detail, the circuit unit 130 may be connected to the power transfer unit 120 in series. That is, the power transfer unit 120 may share the plurality of capacitors constructing the circuit unit 130.

The plurality of capacitors may be connected in parallel. In more detail, the plurality of capacitors may include a first capacitor and a second capacitor. Here, the second capacitor may be connected in parallel to the first capacitor.

A switch may be connected to at least part of the plurality of capacitors of the circuit unit 130 in order to change the assembly of the plurality of capacitors. The controller 140 may change the assembly of the plurality of capacitors by turning on/off the switch. In other words, the controller 140 may decide the number of capacitors to be used for wireless power transfer among the plurality of capacitors, and turn on/off the switch to correspond to the number. In more detail, the controller 140 may turn on the switch when the detected communication standard is the WPC communication standard, and turn off the switch when the detected communication standard is the PMA communication standard.

The controller 140 may control operations of the power supply unit 110, the power transfer unit 120 and the circuit unit 130.

The controller 140 may control the power supply unit 110 to supply power to the power transfer unit 120. Also, the controller 140 may decide a coil to be activated among the at least one coil constructing the power transfer unit 120. Also, the controller 140 may decide the number of capacitors to be used for wireless power transfer among the plurality of capacitors constructing the circuit unit 130.

Here, the controller 140 may decide the number of capacitors to be used for the wireless power transfer according to a communication standard to be used for communication. For example, when communication is carried out according to the WPC communication standard, the controller 140 may decide the number of capacitors to have capacitance appropriate for the PWC communication standard. When communication is carried out according to the PMA communication standard, the controller 140 may decide the number of capacitors to have capacitance appropriate for the PMA communication standard.

The communication block (not illustrated) may include a low pass filter configured to change a cut-off frequency such that communication can be carried out. Here, the controller 140 may control the communication block such that the cut-off frequency can be compliant with each communication standard. An analog demodulator may be used as an example of the communication block. The analog demodulator may be implemented as a low pass filter.

When the receiver's communication standard is detected, the analog demodulator may transmit a signal to the controller 140 such that the cut-off frequency can be changed according to the detected communication standard. In this case, the controller 140 may change the cut-off frequency of the analog demodulator.

Meanwhile, the communication block may be provided in plurality for supporting each communication standard. Here, the controller 140 may execute communication by activating a communication block which supports a detected communication standard among the plurality of communication blocks.

Figure 32:
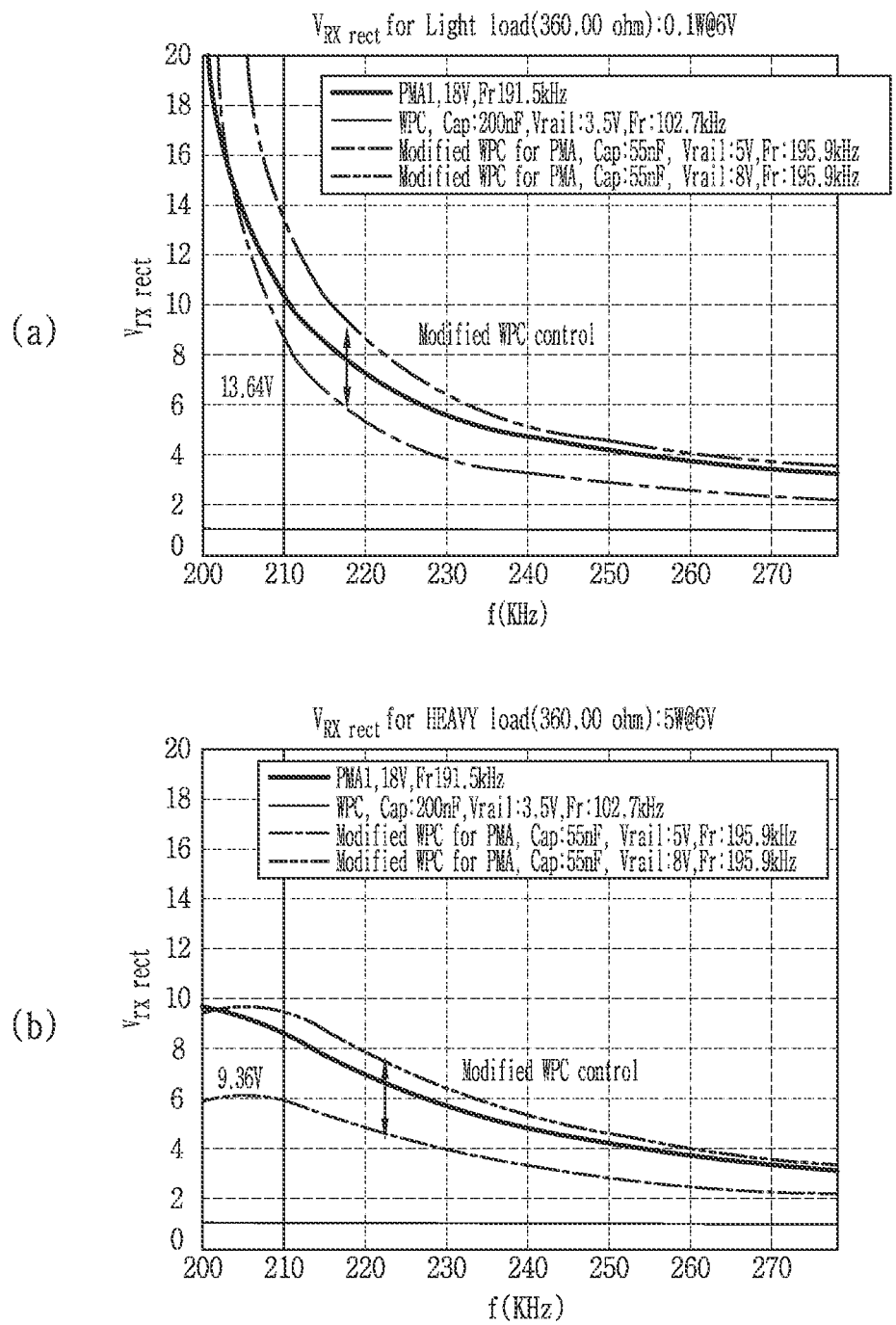
FIG. 32 is a graph illustrating test results as to whether a wireless power transmitter supports communication compliant with two different standards.

FIG. 32 is a graph illustrating an example that communications compliant with the two communication standards (WPC and PMA) are actually executed using a circuit in which a resonant frequency is decided based on the number of capacitors.

First, a test may be carried out under a condition having a small load as illustrated in (a) of FIG. 32, and under a condition having a large load as illustrated in (b) of FIG. 32.

Here, as illustrated in (a) and (b) of FIG. 32, it can be noticed that the PMA and WPC communications are smoothly carried out in both of the conditions having the small and large loads.

The controller 140 may generate a detection signal compliant with each communication standard in a sequential manner so as to detect a communication standard that the wireless power receiver supports. In more detail, the controller 140 may generate a first signal compliant with the WPC communication standard and a second signal compliant with the PMA communication standard in a sequential manner.

Here, the generating of the first signal may be referred to as "analog ping" and the generating of the second signal may be referred to as "active ping." The first signal may transmit a signal of 113 kHz band. Also, the second signal may transmit a signal of 210 kHz band.

The signals may be sequentially generated with a preset interval with respect to each coil. In more detail, the controller 140 may generate the first signal and the second signal in an alternating manner, thereby detecting the communication standard that the wireless power receiver supports.

The foregoing description has been given of the method of detecting the communication standard of the receiver, and controlling the frequency band, the operating topology and the input voltage of the transmitter to wirelessly transfer power according to the detected communication standard. Consequently, a transmitter which is capable of transferring power to receivers complying with different standards can be implemented.

Hereinafter, description will be given in more detail of a method of detecting a communication standard by a wireless power transmitter, with reference to FIG. 33.

When a communication standard that the wireless power receiver supports is detected, the controller 140 may control an operation of at least one of the circuit unit 130 and the voltage supply unit 110 to wirelessly transfer power according to the communication standard.

Figure 33:
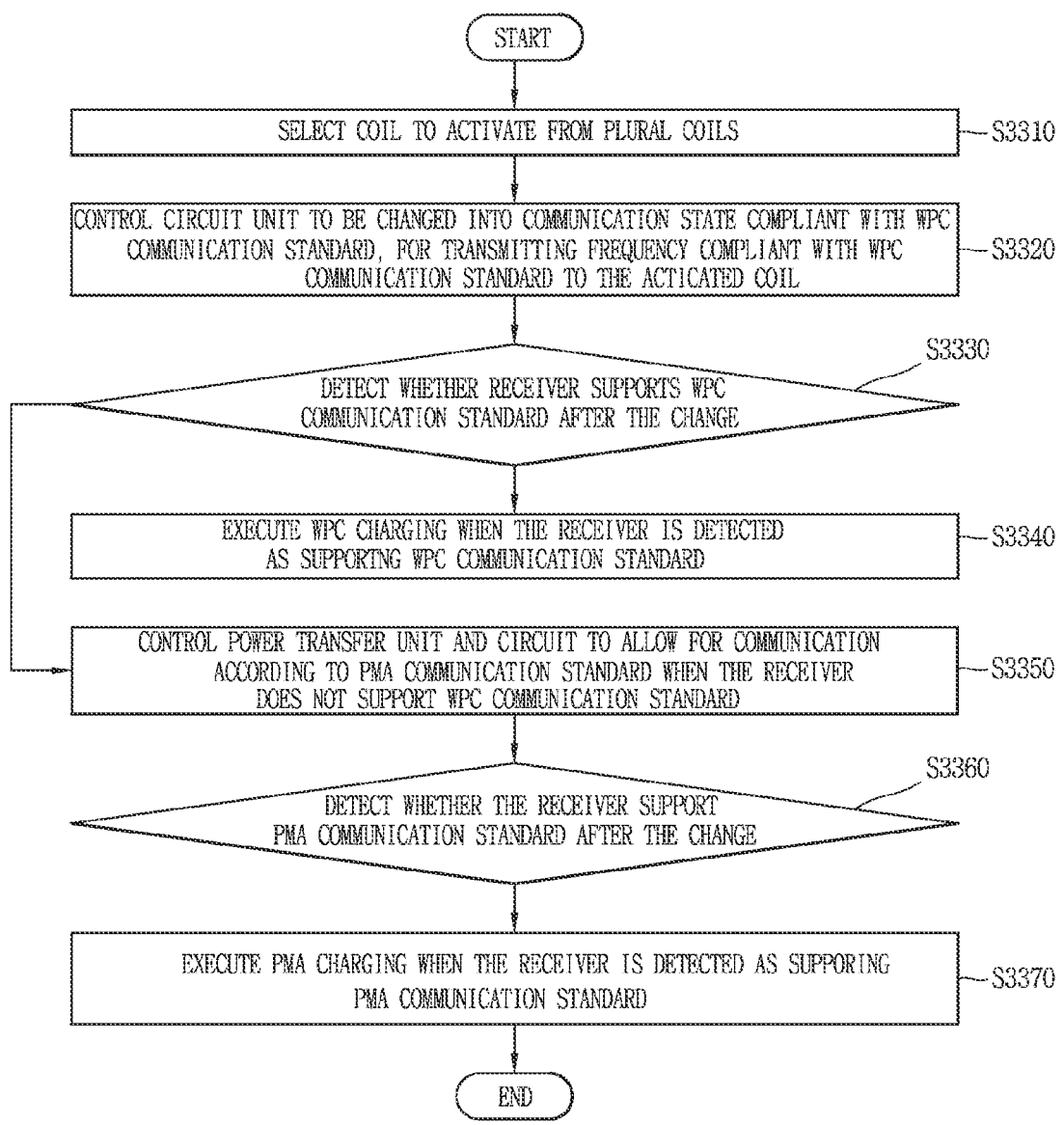
FIG. 33 is a flowchart illustrating a method of detecting a communication standard in a wireless power transmitter.

In more detail, referring to FIG. 33, the controller 140 may select a coil to be activated from a plurality of coils constructing the power transfer unit 120 (S3310). Here, the coil to be activated may be decided based on position information related to the receiver. For example, the controller 140 may transmit an enable signal to a coil located at an area adjacent to the position of the receiver and activate the coil.

Afterwards, the controller 140 may control the circuit unit to be changed into a communication state under the WPC communication standard for transmitting a WPC-compliant frequency to the activated coil (S3320). For example, the controller 140 may set a capacitance value of the circuit unit 130 to 200 nF, and change an operating topology and an input voltage.

After the change, the controller 140 may detect whether or not the receiver supports the WPC communication standard (S3330). If it is detected that the receiver supports the WPC communication standard, the controller 140 may perform WPC charging (S3340).

However, if the receiver does not support the WPC communication standard, the controller 140 may control the power transfer unit 120 and the circuit unit 130 for enabling the communication under the PMA communication standard (S3350). For example, the controller 140 may set a capacitance value of the circuit unit 130 to 55 nF, activate a PMA communication unit, and change an operating topology and an input voltage (S3350).

After the change, the controller 140 may detect whether or not the receiver supports the PMA communication standard (S3360). If the receiver is detected as supporting the PMA communication standard, the controller 140 may carry out PMA charging (S3370).

FIG. 34 is a graph illustrating test results according to methods of detecting the WPC and PMA communication standards. As illustrated in FIG. 34, a wireless power transmitter disclosed herein may transmit different signals complying with different communication standards to a plurality of coils with a preset time interval, respectively.

Here, when a response to one of the signals is received, the wireless power transmitter may control the circuit unit 130 to have a capacitance value which is defined in the communication standard according to the signal. That is, the controller 140 may change a frequency value to support the communication standard compliant with the signal.

For example, (a) of FIG. 34 illustrates that communication is actually smoothly carried out after controlling the capacitance value to be appropriate for the PMA standard. (b) of FIG. 34 illustrates that communication is actually smoothly carried out after controlling the capacitance value to be appropriate for the WPC standard.

Figure 35:
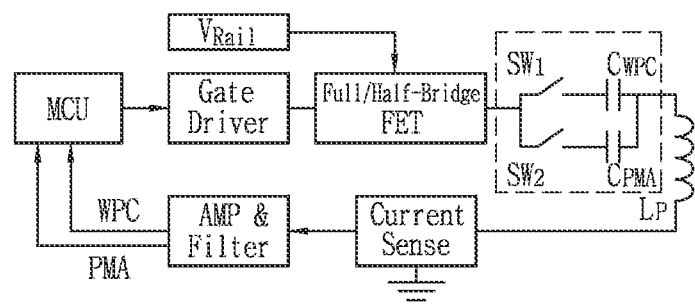
FIG. 35 is a circuitry view illustrating another method of constructing a circuitry view of a wireless power transmitter.

FIG. 35 is a structural view illustrating another type of circuit view in a wireless power transmitter according to one exemplary embodiment disclosed herein.

The aforementioned circuit view has the structure in which a switch is connected to one of two capacitors and a frequency is controlled by turning on/off the switch according to a communication standard. In addition to the structure, the present disclosure may have a structure in which a switch is connected to each capacitor to decide which one of the two capacitors is to be used according to a communication standard.

In this case, the controller 140 may change a frequency by controlling first and second switches according to a detected communication standard. Also, even in the structure, all of the other operations except for the addition of the first and second switches may be the same as those in the foregoing description.

As described above, a wireless power transmitter disclosed herein may be allowed to use an assembly of single coils compliant with two different standards, as a multi-coil, so as to be interoperable with every standard even if the coil of the receiver supports any standard.

The present disclosure may implement a wireless power transmitting method, a wireless power and a wireless charging system, which are capable of wirelessly transmitting power of standards corresponding to receivers which support different standards, through a multi-coil solution.

Also, the present disclosure may provide a multi-coil solution which can implement a transmitter, which complies with two different standards using a single coil, in a manner of overlapping a pair of coils with another coil with a different shape. Also, the overlapped coils may be configured to support two different standards, thereby extending active areas of a wireless power transmitter, a wireless power receiver, and a wireless charging system. That is, a multi-coil, namely, an assembly of single coils complying with two different standards may be used for the wireless power transmitter, such that the transmitter can support a standard even if the coil of the receiver complies with any standard.

The present disclosure may also provide a transmitter having interoperability between different standards in a manner of changing a resonant frequency of the transmitter with respect to receivers supporting different standards. This may allow the transmitter to transfer power in a wireless manner, irrespective of a communication standard of a receiver.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

What is claimed is:

1. A wireless power transmitter configured to transfer power to a wireless power receiver in a wireless manner, the transmitter comprising:
    a first coil configured to convert a current into a magnetic flux;
    a second coil configured to be adjacent to the first coil on a plane, wherein the first and second coils are wound into a quadrilateral shape and comply with a first standard;
    a third coil configured to have a different shape from the first and second coils and have at least part thereof which overlaps the first and second coils, respectively, wherein the third coil is wound into a circular shape and complies with both the first standard and a second standard; and
    a power transmission control unit operable to the third coil if the wireless power receiver supports the second standard.

2. The wireless power transmitter of claim 1, wherein the power transmission control unit selectively applies one of a plurality of voltages to the third coil.

3. The wireless power transmitter of claim 2, wherein the power transmission control unit controls a driving circuit unit, and
    wherein the driving circuit unit includes a first switch connected to a first capacitor, and a second switch connected to a second capacitor and the first capacitor and the second capacitor is connected to the third coil in parallel.

4. The wireless power transmitter of claim 3, wherein the first and second switches are controlled to apply the one of the plurality of voltages to the third coil according to whether the standard corresponds to the first standard or the second standard, different from each other.

5. The wireless power transmitter of claim 1, wherein the power transmission control unit applies an input voltage to at least one of the first, second and third coils, and after detection of the standard, boosts or depressurizes the input voltage to correspond to the standard.

6. The wireless power transmitter of claim 5, wherein the power transmission control unit determines which one of the first, second and third coils is to be controlled when the standard is the first standard, and carries out a frequency control by boosting the input voltage applied to the third coil when the standard is the second standard.

7. The wireless power transmitter of claim 6, wherein the first and second coils are coils to which the input voltage is applied in compliance with the first standard, and
wherein the third coil is set such that a voltage higher than the input voltage is applied thereto.

8. The wireless power transmitter of claim 6, wherein the first and second coils are coils for which a frequency control or a voltage control is carried out in compliance with the first standard, and
wherein the third coil is a coil for which the voltage control is carried out in compliance with the first standard.

9. The wireless power transmitter of claim 1, wherein the first and second coils are wound into the quadrilateral shape in which at least part is straight.

10. The wireless power transmitter of claim 9, wherein the first and second coils each comprise a single layer, and
wherein the third coil comprises a plurality of layers in a manner that the coil is connected at an inner side thereof and wounded into a plurality of layers.

11. The wireless power transmitter of claim 9, wherein the third coil is a coil which complies with both the first standard and the second standard, and
wherein the first and second coils are coils compliant with the first standard.

12. A wireless power transfer method, which is configured to transfer power to a wireless power receiver in a wireless manner, the method comprising:
applying an input voltage to at least one of first, second, and third coils;
detecting a standard applied to the wireless power receiver to correspond to the input voltage; and
detecting a coil to be driven from the first, second and third coils when the standard is a first standard, and driving the third coil when the standard is a second standard,
wherein the first and second coils are wound into a quadrilateral shape and comply with the first standard, and
wherein the third coil is wound into a circular shape and complies with both the first standard and the second standard.

13. The method of claim 12, wherein the detecting of the coil to be driven is carried out to detect whether a coil to be driven is a coil wound into the quadrilateral shape or a coil wound into the circular shape when the standard is the first standard.

14. The method of claim 13, wherein the input voltage is boosted when the coil to be driven is the coil wound into the circular shape, and the input voltage is maintained when the coil to be driven is a coil wound into a quadrilateral shape.

15. The method of claim 12, wherein the input voltage is boosted and a frequency control is carried out when the standard is the second standard.

16. A wireless charging system:
a transmitter configured to transfer power in a wireless manner; and
a receiver configured to receive power in a wireless manner,
wherein the transmitter comprises:
a first coil configured to convert a current into a magnetic flux;
a second coil configured to be adjacent to the first coil on a plane, wherein the first and second coils are wound into a quadrilateral shape and comply with a first standard;
a third coil configured to have a different shape from the first and second coils and have at least part thereof which overlaps the first and second coils, respectively, wherein the third coil is wound into a circular shape and complies with both the first standard and a second standard; and
a power transmission control unit operable to drive the third coil if the wireless power receiver supports the second standard.

17. The system of claim 16, wherein the power transmission control unit selectively applies one of a plurality of voltages to the third coil.

18. The system of claim 16, wherein the power transmission control unit applies an input voltage to at least one of the first, second and third coils, and after detection of the standard, boosts or depressurizes the input voltage to correspond to the standard.

19. The system of claim 16, wherein the first and second coils are wound into the quadrilateral shape in which at least part is straight.

* * * * *